US006920678B2

(12) United States Patent
Ooe et al.

(10) Patent No.: US 6,920,678 B2
(45) Date of Patent: Jul. 26, 2005

(54) MACHINING CELL IN AUTOMATIC MACHINING SYSTEM AND AUTOMATIC HONING SYSTEM

(75) Inventors: Hiroyuki Ooe, Kyoto (JP); Toru Fujimura, Kyoto (JP); Kazuhiko Tsuji, Kyoto (JP); Yasuo Tomita, Kyoto (JP)

(73) Assignee: Nissin Manufacturing Co., Ltd., Kyoto (JP)

( * ) Notice: Subject to any disclaimer, the term of this patent is extended or adjusted under 35 U.S.C. 154(b) by 92 days.

(21) Appl. No.: 10/276,990

(22) PCT Filed: Apr. 9, 2002

(86) PCT No.: PCT/JP02/03527

§ 371 (c)(1),
(2), (4) Date: Nov. 20, 2002

(87) PCT Pub. No.: WO02/083361

PCT Pub. Date: Oct. 24, 2002

(65) Prior Publication Data

US 2003/0121138 A1 Jul. 3, 2003

(30) Foreign Application Priority Data

Apr. 10, 2001 (JP) .......................................... 2001-111680

(51) Int. Cl.[7] .............................................. B23P 23/06
(52) U.S. Cl. ............................ 29/563; 29/33 P; 451/5; 451/6; 451/61
(58) Field of Search ................................ 29/563, 33 P; 483/14–15; 451/5, 6, 51, 61, 65; 700/164, 172, 174, 195

(56) References Cited

U.S. PATENT DOCUMENTS

| | | | | |
|---|---|---|---|---|
| 1,617,606 A | * | 2/1927 | Pierle .......................... | 29/33 P |
| 3,530,571 A | * | 9/1970 | Perry ........................... | 29/563 |
| 3,729,083 A | * | 4/1973 | Wollenhaupt et al. ........ | 29/563 |
| 3,952,388 A | * | 4/1976 | Hasegawa et al. .......... | 29/33 P |
| 4,110,897 A | * | 9/1978 | Hipwell et al. ............... | 483/10 |
| 4,133,423 A | * | 1/1979 | Zankl .......................... | 29/563 |
| 4,185,376 A | * | 1/1980 | Johnstone .................... | 483/14 |
| 4,473,883 A | * | 9/1984 | Yoshida et al. ............... | 483/15 |
| 4,886,157 A | * | 12/1989 | Sunnen et al. .............. | 198/839 |
| 4,887,221 A | * | 12/1989 | Davis et al. .................... | 451/5 |
| 5,361,486 A | * | 11/1994 | Harmsen et al. .............. | 29/563 |
| 5,625,561 A | * | 4/1997 | Kato et al. ................... | 700/193 |
| 6,185,802 B1 | * | 2/2001 | Gruber et al. .............. | 29/33 P |

FOREIGN PATENT DOCUMENTS

| | | | |
|---|---|---|---|
| DE | 19840942 C1 | * | 3/2000 |
| JP | 48-84972 A1 | | 11/1973 |
| JP | 49-132678 A1 | | 12/1974 |
| JP | 08-2660 A1 | | 1/1996 |
| JP | 2001-105297 A | * | 4/2001 |

OTHER PUBLICATIONS

International Preliminary Examination Report for PCT/JP–2/03527 mailed on Jul. 16, 2002.

* cited by examiner

Primary Examiner—Erica Cadugan
(74) Attorney, Agent, or Firm—Rader, Fishman & Grauer PLLC

(57) ABSTRACT

This is a processing cell of an automatic machining system having a small, lightweight and simple structure, easy to determine or change the number of process, easy in design, and low in apparatus cost. A processing cell (A) has a unit structure comprising a conveying device (10) forming a part of a work conveying route (1), a fine boring machine (5a) or honing machine (5b), (5c) as a single machine tool, and a control unit for linking them mutually and controlling, and these cells are installed, being free to increase or decrease in number, in the machining section of automatic machining system such as automatic honing system.

23 Claims, 30 Drawing Sheets

Right circulation →

← Left circulation

US 6,920,678 B2

MACHINING CELL IN AUTOMATIC MACHINING SYSTEM AND AUTOMATIC HONING SYSTEM

TECHNICAL FIELD

The present invention relates to a processing cell of an automatic machining system, and an automatic honing system, and more particularly to an automatic machining technology such as automatic honing process for conveying, for example, works provided with prepared holes sequentially along a work conveying route at specific intervals, and machining holes sequentially and continuously in the works by means of a boring machine and a honing machine installed within the work conveying route.

BACKGROUND ART

Honing is known, for example, as one of machining methods for finishing the inner circumference of works precisely. In honing process, a honing tool and a work are set in a relatively floating state, and rotary and reciprocal motions are given to the honing tool, and the inner circumference of the work is finished precisely while expanding the wheel of the honing tool by a wedge or cone.

Recently, as an apparatus for efficiently honing the inner circumference of works as mass production pieces such as the inner circumference of automotive parts, an automatic honing system has been developed for honing the works conveyed at specific intervals sequentially and continuously by means of plural honing machines arrayed in a line.

An example of such automatic honing system is shown in FIG. 30, in which a work conveying route a is formed in a loop, and a work loading b, a work machining section c, and a work unloading d are arrayed in this work conveying route a.

At the work loading b, works W supplied in line by a work feeder e such as parts feeder are mounted on a honing jig g waiting at a detaching position P of the work conveying route a by means of a robot device f. The honing jig g holding the work W is sent to a position of a prepared hole detecting device i by means of a delivery device h, and the inside diameter of the prepared hole of the work W is detected by the prepared hole detecting device i.

In succession, while holding the work W, the honing jig g is sent to the work machining section c, in which the work W is conveying in a cycle sequentially comprising a rough honing machine k, a first detecting device 1, an intermediate honing machine m, a second detecting device n, a finish honing machine o, and a third detecting device p, by means of a transfer device j, and is positioned at each machine position, so that the specified honing process is executed sequentially and automatically.

The work W completely finished in the work machining section c is cleaned by a brush device q, and is sent out to the detaching position P by means of a discharge device r, a return device s, and a pushing device t in the work unloading d, and is sorted according to the result of measurement by the third detecting device p by the robot device f at the work loading b again, and a conforming work is put into a conforming piece chute u, and a defective piece is put into a reject chute v.

This automatic honing system is designed as a tailored machine for specific works W depending on the shape, dimensions and machining conditions of the works, and all sections a, b, c, d are integrally fixed on a large machine frame (not shown), and are driven by a control device x which controls the entire system in batch.

In such system configuration designed as a tailored machine for specific works W, the following problems were known.

(1) The number of process of honing is determined by the accuracy of the shape of prepared holes of the works W, stock removal, and required shape accuracy, but the accuracy of shape of prepared holes and stock removal are not stable in the stage of trial production.

Accordingly, in the configuration in which all sections a, b, c, d are integrally fixed on a large machine frame, and the entire system is controlled by one control device x in batch, the number of process cannot be determined until reaching the final stage.

(2) By the same reason, if the prepared hole accuracy of the works W is changed or if the required machining accuracy of the works W is changed, the number of process cannot be changed.

(3) Also by the same reason, it is hard to determine the capital investment if prediction of the production quantity of works W is difficult.

(4) Since this is a tailored machine designed for specific works W, when production of the specific works W is stopped, the mechanical configuration of the entire system must be modified in order to use for machining of other works differing in shape, dimension and machining conditions, or if such modification is impossible, the entire system must be discarded, and the apparatus cost is very high.

(5) Since the sections a, b, c, d are composed as one integral apparatus, hydraulic units as drive sources for individual devices, coolant tanks used in machining, and others shared among individual constituent devices are large in size and installed separately, and the entire system is large and complicated, and the apparatus cost is soaring.

Most of these problems are not limited to this automatic honing system, but were common among automatic machining systems for machining machine parts and other mass production pieces sequentially and continuously by using plural machine tools arrayed in a line.

The invention is devised in the light of the problems of such prior art, and it is hence an object thereof to present a processing cell of an automatic machining system having a small, lightweight and simple structure, capable of determining or changing the number of process easily, easy in design, and lowered in the apparatus cost.

It is other object of the invention to present a structure of an automatic honing system comprising a plurality of such processing cells.

DISCLOSURE OF THE INVENTION

To achieve the objects, the processing cell of the invention composing a machining section of an automatic machining system for conveying the works along the work conveying route continuously at specific intervals, and machining the works sequentially and continuously, and has a unit structure comprising at least a conveying device for composing a part of the work conveying route, a single machine tool, and a control unit for linking them mutually and controlling, and is designed to be installed in the machining section of the automatic machining system so as to be freely increased or decreased in number.

In a preferred embodiment, the conveying device comprises at least a conveying rail for mounting and guiding a processing jig for accommodating and holding works, work moving means for sending the processing jig mounted on the conveying rail to a specified position in cycle operation, and positioning means for positioning the processing jig sent by the work moving means in cycle operation at the specified position. The conveying device further comprises a return rail for mounting and guiding the processing jig for accommodating and holding the works finished in the processing step, and work returning means for returning and moving the processing jig mounted on the return rail.

At least the conveying rails or the return rails of the conveying device are arrayed and positioned so as to form a part of the straight portion of the work conveying route, and the machining sections of the automatic machining system are designed to be increased or decreased in number or reshuffled in combination. The conveying device is desired to be configured so as to invert the work flowing direction normally and reversely.

The automatic honing system of the invention is an automatic honing system for honing the works conveyed along the work conveying route at specific intervals sequentially and continuously, by using plural honing machines disposed within the work conveying route for conveying the works, in which the honing section for honing the works is composed of boring cells for boring the prepared holes of works, and honing cells for honing the works so as to be freely increased or decreased in number, and these plural processing cells are mutually linked, driven and controlled, and the boring cell has a unit structure comprising at least a conveying device for composing a part of the work conveying route, a single boring machine, and a control unit for linking them mutually and controlling, and the honing cell has a unit structure comprising at least a conveying device for composing a part of the work conveying route, a single honing machine, and a control unit for linking them mutually and controlling.

In a preferred embodiment, the loading cell for composing the work delivery section, plural processing cells, and the unloading cell for composing the work discharge section are arrayed and disposed in a line, the work conveying route is formed in a loop, or the loading cell for composing the work delivery section, plural processing cells, and the unloading cell for composing the work discharge section are arrayed and disposed in a line, the work-conveying route is formed in a straight line.

It further comprises a honing jig for holding the work, being conveyed in the work conveying route, and this honing jig comprises a jig base movably placed on the work conveying route, an oscillator disposed on the jig base oscillatably in three dimensions, and a work holder attached to this oscillator. By contrast, the conveying device of the boring cell comprises locking means for fixing and supporting the work holder of the honing jig positioned at the boring position of the conveying rail.

Further, at least the conveying rails or return rails of the conveying device in the processing cells are arrayed and positioned so as to form a part of the straight portion of the work conveying route, so that the honing sections of the automatic honing system are combined and formed. The conveying device is preferred to be configured so as to invert the work flow direction normally and reversely.

In the automatic machining system comprising the processing cells of the invention, for example, in the automatic honing system, specified honing process is executed automatically and continuously in the following sequence by means of a control device.

For instance, at the work delivery position of the work conveying route formed in a loop, by the work delivery unit composed of the loading cell, the work is automatically set on the honing jig on the work conveying route. As a result, the work is held oscillatably in three dimensions by the floating structure of the honing jig.

The honing jig holding the work having a prepared hole is conveyed on the work conveying route, and is automatically conveyed and positioned at the processing position of the honing section composed of plural processing cells, and a specified hole is drilled by the boring machine and honing machine of each processing cell (that is, boring by the boring machine and honing by the honing machine), and the work processing diameter is measured by the detecting device. This result of measurement is used in judgement of approval of the work, and is fed back to the control unit of the boring machine and honing machine of the processing cell, and next hole processing is controlled.

The honing jig holding the work after processing is discharged from the honing section by the work discharge section composed of unloading cell, and is returned and conveyed to the work delivery position.

Again, by the work delivery section, the work is taken out from the honing jig, and is selected and discharged.

In particular, in the automatic honing system of the invention, the work is bored by the boring machine of the boring cell prior to the honing process by the honing machine of the honing cell, and therefore the hole is processed precisely by a smaller number of process than in the conventional automatic honing system.

That is, the honing process is processing along the shape of the prepared hole (for example, in a bent state if the prepared hole is bent), that is, the so-called copying process, and therefore the final finish processing accuracy in the conventional automatic honing system depends on the effect of the processing accuracy of the prepared hole.

By contrast, in the automatic honing system of the invention, prior to honing process, the boring process is provided for processing the prepared hole by force, and therefore the prepared hole of the work can be i) corrected to increase the stock removal by heat treatment strain or the like, ii) corrected by force regardless of the processing accuracy (roundness, cylindricality, etc.), and iii) corrected of end squareness, concentricity, etc. which could not be corrected by force in the conventional honing process. As a result, the final finishing processing accuracy in the automatic honing system of the invention does not depend on the processing accuracy of the prepared hole, so that a very precise hole processing is realized.

In the automatic honing system, the processing cells are connected and disposed so as to be increased or decreased freely in number, and the structure is small, lightweight and simple, the number of process can be determined or changed easily, the design is easy, and the apparatus cost can be reduced.

That is, the number of process in the honing process is determined by the accuracy of shape of the prepared hole of the work, stock removal, and required shape accuracy, and in the stage of trial production, the accuracy of prepared hole shape and stock removal are not stable, while the processing cells of the invention are designed to be incorporated in the honing section of the automatic honing system by increasing or decreasing in number freely, and therefore if the number of process cannot be determined early, it can be determined effectively later.

By the same reason, if the accuracy of the prepared hole of the work is changed, or if the required processing accuracy of the work is changed, by properly combining the processing cells which can be freely increased or decreased in number, the number of process can be changed promptly and easily.

Also by the same reason, if it is difficult to predict the production amount of works, the capital investment can be determined easily by considering changeover of multiple models or dispersion of processes including the processing cells freely increased or decreased in number.

By the same reason, if the accuracy of the prepared hole of the work is changed, or if the required processing accuracy of the work is changed, by properly combining the processing cells which can be freely increased or decreased in number, the number of process can be changed promptly and easily.

Also by the same reason, if it is difficult to predict the production amount of works, the capital investment can be determined easily by considering changeover of multiple models or dispersion of processes including the processing cells freely increased or decreased in number.

Moreover, since the processing cells are composed in unit structure comprising the conveying device composing a part of the work conveying route, a single honing machine, and a control unit for linking them mutually and controlling, so as to be freely increased or decreased in number, if production of the specific works designed to be processed is stopped, in order to use for machining of other works differing in shape, dimension and machining conditions, part of the system may be modified or changed, the processing cells can be properly increased or decreased, depending on the shape, dimensions and processing conditions of the works.

Further, since the processing cells are in cell structure, hydraulic units as drive source of the constituent devices, and coolant tanks used in machining, and others can be set independently and reduced in size in each processing cell, and can be mounted on the main body frame of each processing cell, so that the entire system is simplified and reduced in size.

BRIEF DESCRIPTION OF THE DRAWINGS

FIG. 21 is a plan view for explaining the combination changing procedure of the work flow direction in the conveying section of the conveying device of the processing cell, in which

FIG. 22 is a plan view for explaining the combination changing procedure of the work flow direction in the return section of the conveying device of the processing cell, in which

FIG. 23 is a diagram for explaining a specific combination changing procedure when changing the combination of the work flow direction of the return section, in which

FIG. 24 is a plan view for explaining the combination changing procedure of the work flow direction in the honing machine and detecting device of the processing cell, in which

FIG. 28 is a diagram showing the relation of the honing jig and lock device, in which

FIG. 29 is a diagram showing the relation of the honing jig and positioning device, in which

DETAILED DESCRIPTION OF PREFERRED EMBODIMENTS

Preferred embodiments of the invention are described below while referring to the accompanying drawings.

Figure 1:
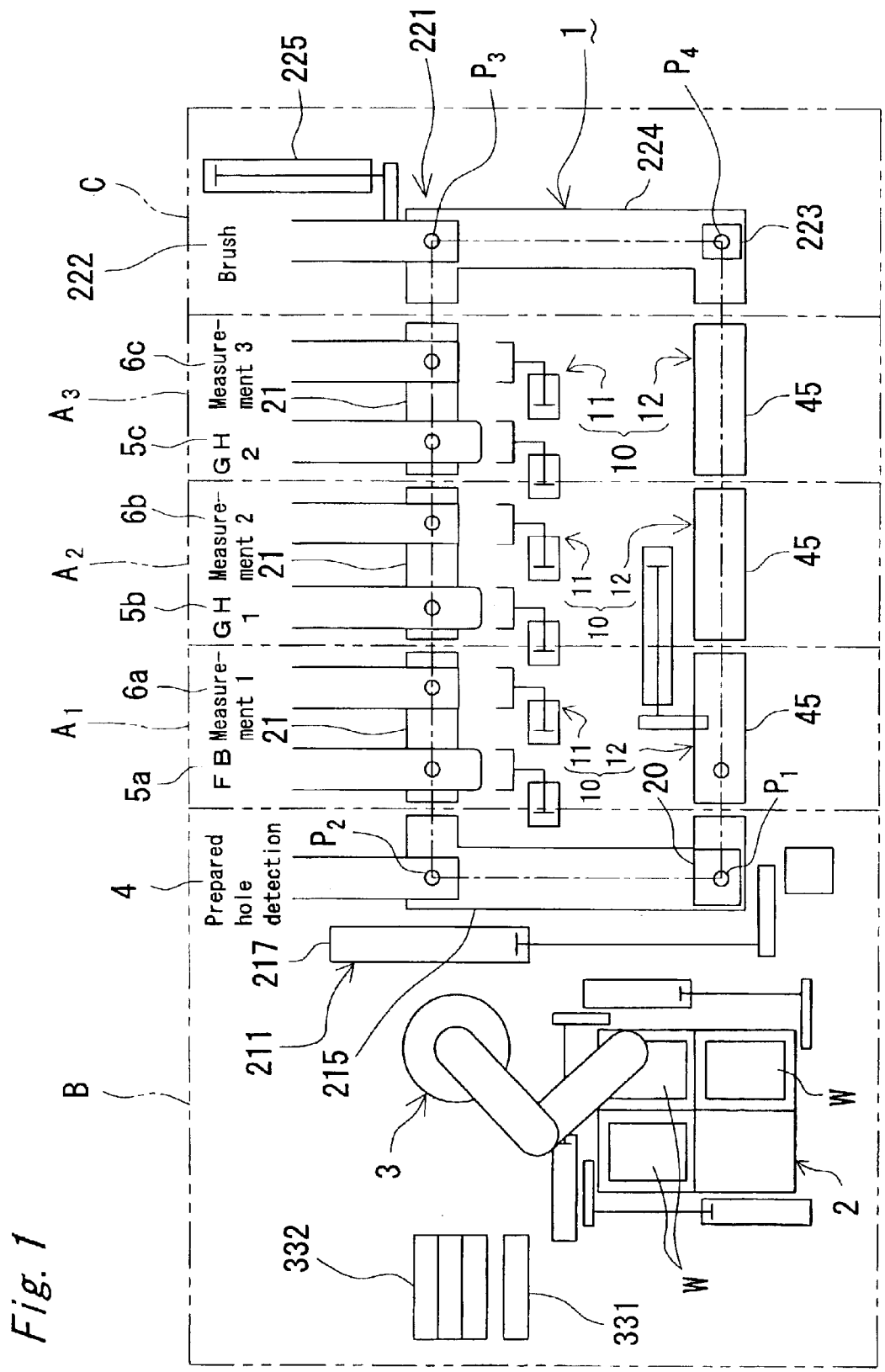
FIG. 1 is a plan view showing a schematic configuration of automatic honing system in an embodiment of the invention.

An automatic honing system of the invention is shown in FIG. 1, in which the system conveys works W, W, . . . along a work conveying route 1 continuously at specific intervals, and hones these works W, W, . . . sequentially and continuously.

In this automatic honing system, specifically, delivery cells B and discharge cells C are arrayed in a straight row at both sides of a plurality of (three in this example) processing cells $A_1$, $A_2$, $A_3$ in unit structure, and the system mainly comprises the work conveying route 1 formed in a loop composed of these processing cells $A_1$, $A_2$, $A_3$, B, C, a work feeder 2, a work loading and unloading robot 3, a prepared hole detector 4, a boring machine (accuracy boring machine in this example) 5a, a first detecting device 6a for accuracy boring, a first honing machine 5b for intermediate processing, a second detecting device 6b for intermediate processing, a second honing machine 5c for finishing, and a third detecting device 6c for finishing.

The processing cells $A_1$, $A_2$, $A_3$ compose the honing section of this honing system, and have a same basic mechanical structure to be installed in the honing section to be freely increased or decreased in number, and a specific configuration of the processing cell $A_1$ having the accuracy boring machine 5a is shown in FIG. 2 to FIG. 12, and a specific configuration of the processing cells $A_2$, $A_3$ having the honing machines 5b and 5c is shown in FIG. 13 to FIG. 20. The specific configuration of the processing cell $A_1$, and the processing cells $A_2$, $A_3$ is sequentially explained below.

The processing cell $A_1$ having the accuracy boring machine 5a has a unit structure as shown in FIG. 2 to FIG. 12, comprising a conveying device 10 forming a part of the work conveying route 1, a single accuracy boring machine (machine tool) 5 (5a), a detecting device 6 (6a), and a control unit 7 (7a) for linking them mutually and controlling.

The conveying device 10 is composed of a conveying section 11 for conveying the works W to be processed, and a return section 12 for conveying the works W after processing.

Figure 3:
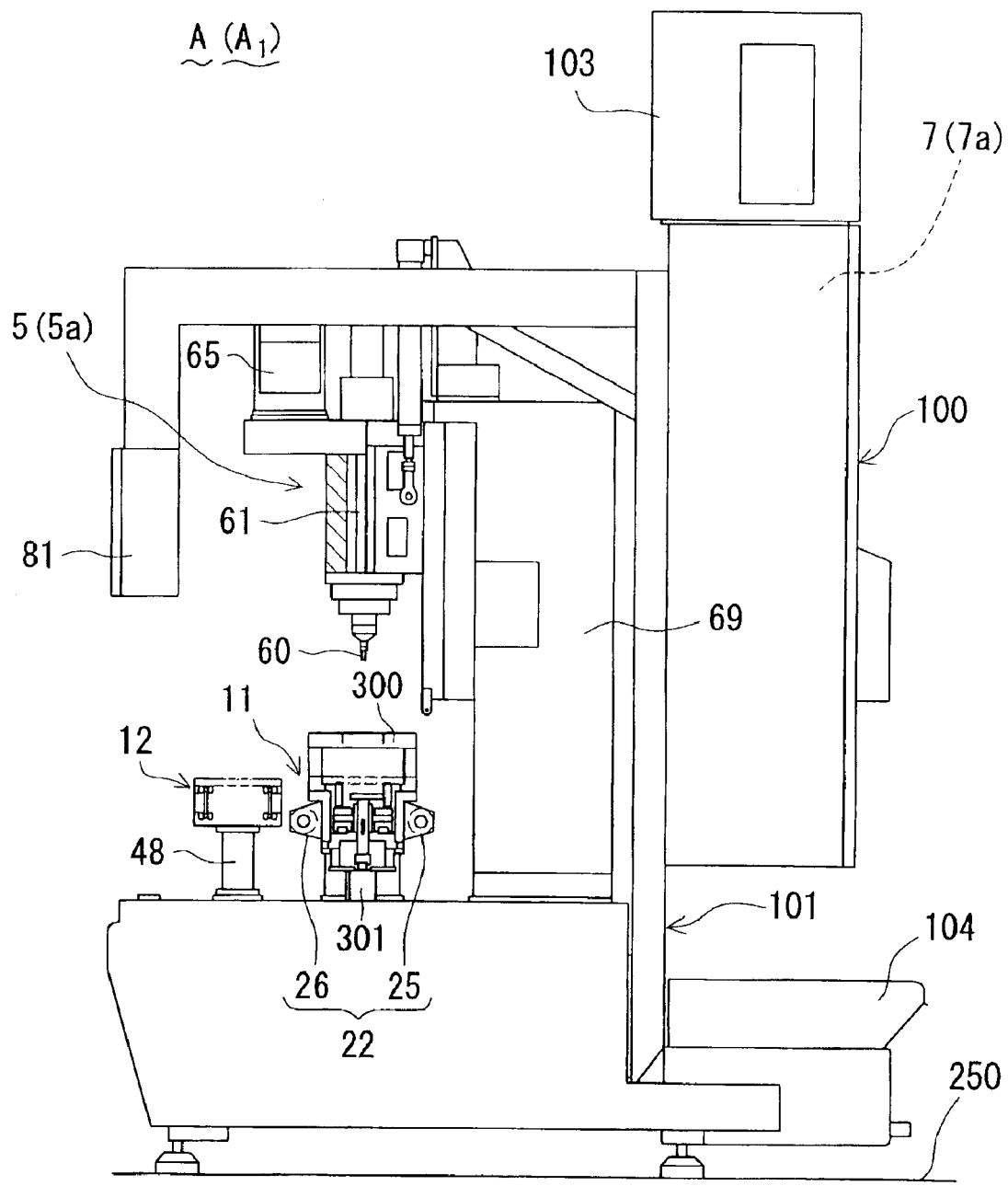
FIG. 3 is a side view showing the same processing cell.

The conveying section 11 includes, as shown in FIG. 4 to FIG. 7, a conveying rail 21, a work moving device (work moving means) 22, and a positioning device (positioning means) 23, and is composed, as shown in FIG. 3, to pass through the lower side position of the accuracy boring machine 5a and detecting device 6a, and is disposed on a conveying section platform 24. The conveying rail 21 and return rail 45 for composing the conveying section 11 function also as the installation reference of the processing cell $A_1$ as mentioned below, and are also designed to invert the flow direction of the works W normally and reversely.

Figure 4:
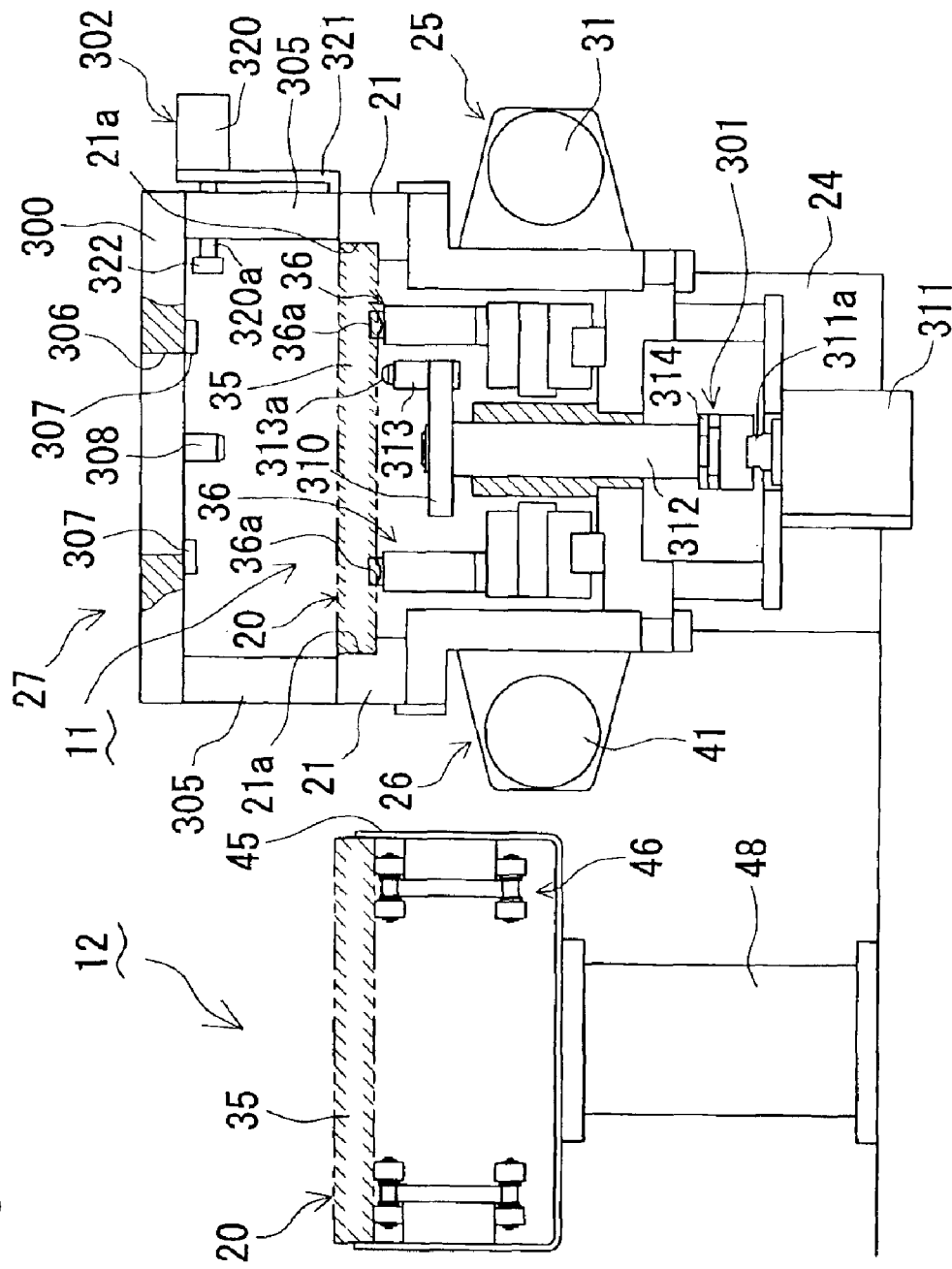
FIG. 4 is a magnified side view of the lower part of the processing cell.
Figure 5:
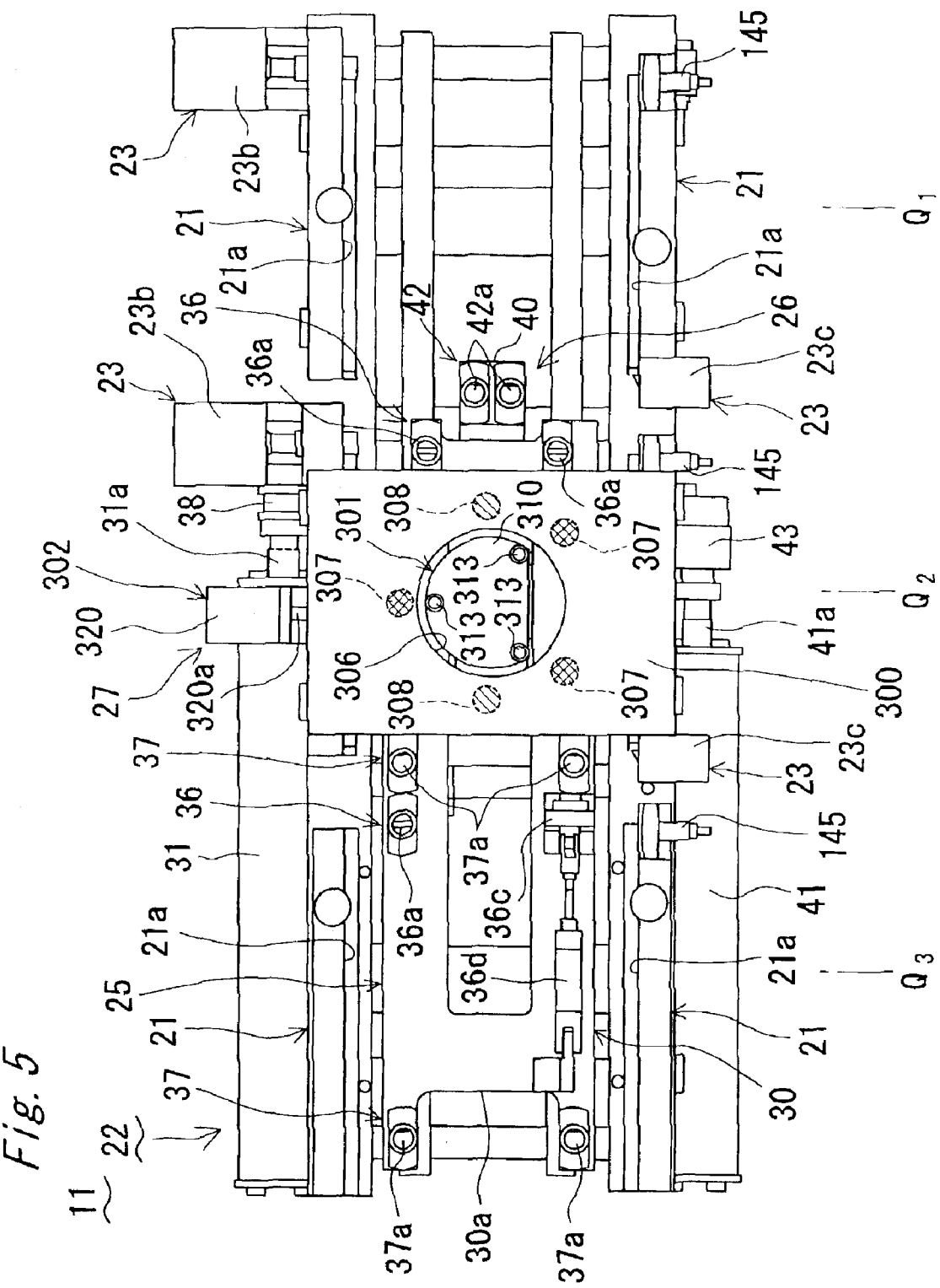
FIG. 5 is a plan view showing a conveying section of conveying device of the processing cell.

The conveying rail 21 is for mounting and guiding the honing jig 20 for accommodating and holding the work W, and as shown in FIG. 4 and FIG. 5, the guide rail is in a straight shape having a guide groove 21a for guiding the honing jig 20, and at the processing position of the accuracy boring machine 5a and the measuring position of the detecting device 6a, the positioning device 23 for positioning the honing jig 20 is provided respectively. At the processing position of the accuracy boring machine 5a, there is a lock device (locking means) 27 for fixing and supporting the motion of the honing jig 20 positioned by the positioning device 23.

The work moving device 22 is to feed the honing jig 20 mounted on the conveying rail 21 to the specified position in cycle operation, and specifically it is composed of a cylinder device for pressing and moving the honing jig 20, and in the shown embodiment it is composed of a pair of air cylinder devices 25, 26.

The first air cylinder device 25 comprises a moving table 30 provided reciprocally along the guide groove 21a of the conveying rail 21, and an air cylinder 31 for moving this moving table 30 reciprocally.

The moving table 30 has two sets of a structure for holding the honing jig 20 (jig base holding structure) at front and rear positions at a specific interval, and is designed to array and hold two honing jigs 20. The front and rear jig base holding structures are basically identical, and specifically comprise a pair of engaging pawl mechanisms 36, 37 for engaging with and holding the front and rear edges of the pallet of the honing jig 20 or jig base 25 from the front and rear sides.

The front engaging mechanism 36 is composed of a pair of right and left engaging pawls 36a, 36a having slopes at front and rear sides, and repulsive springs 36b, 36b for pushing these engaging pawls 36a, 36a always upward repulsively. As a result, the pair of right and left engaging pawls 36a, 36a are engaged in a structure for allowing relative move in both front and rear directions of the jig base 35 of the honing jig 20. That is, when the jig base 35 moves relatively in the front and rear directions, the pair of right and left engaging pawls 36a, 36a are lowered by resisting the repulsive force of the repulsive springs 36b, 36b by the action of the slopes at both front and rear sides, thereby allowing a relative move of the jig base 35.

The front side engaging mechanism 36 in the both jig base holding structures at the rear side is composed of the engaging pawl 36a and repulsive spring 36b in one of the right and left sides, and the other side is composed of an engaging pawl 36c oscillatable in the vertical direction, and an air cylinder 36d for oscillating this engaging pawl 36c in the vertical direction between the engaging position (upright position shown in FIG. 7) and the disengaging position (prone position not shown), and this engaging pawl 36c collaborates with the rear side engaging mechanism 37, and functions to position and lock the jig base 35 located at this position.

The rear side engaging mechanism 37 is composed of a pair of right and left engaging pawls 37a, 37a having slopes only at the rear side, and repulsive springs 37b, 37b for pushing these engaging pawls 37a, 37b always upward repulsively. As a result, the pair of right and left engaging pawls 37a, 37a have an engaging structure for allowing relative move only in the front direction of the jig base 35 of the honing jig 20.

That is, when the jig base 35 moves relatively in the front direction, the pair of right and left engaging pawls 37a, 37a are lowered by resisting the repulsive force of the repulsive springs 36b, 36b by the action of the slopes at the rear side, thereby allowing a relative move of the jig base 35, and on the other hand when the jig base 35 moves relatively in the rear direction, since the front sides of the pair of right and left engaging pawls 37a, 37a are vertical planes, they are not lowered by the repulsive force of the repulsive springs 36b, 36b, thereby engaging and blocking the relative move of the jig base 35.

The air cylinder 31 is installed horizontally on the conveying section platform at the lower side position of the conveying rail 21, and its piston rod 31a is connected to the moving table 30 through a joint 38.

The second air cylinder device 26 comprises a moving table 40 provided reciprocally along the guide groove 21a of the conveying rail 21, and an air cylinder 41 for moving the moving table 40 reciprocally, at the lower side of the moving table 30 of the first air cylinder device 25.

The moving table 40 has an engaging pawl mechanism 42 for engaging with and holding the rear edge of the jig base 35 of the honing jig 20 at its front end position.

The engaging mechanism 42 is composed of a pair of right and left engaging pawls 42a, 42a having slopes only at the rear side, and repulsive springs 42b, 42b for pushing these engaging pawls 42a, 42a always upward repulsively. As a result, the pair of right and left engaging pawls 42a, 42a have a structure for allowing relative move only in the front direction of the jig base 35 of the honing jig 20.

That is, when the jig base 35 moves relatively in the front direction, the pair of right and left engaging pawls 42a, 42a are lowered by resisting the repulsive force of the repulsive springs 42b, 42b by the action of the slopes at the rear side, thereby allowing a relative move of the jig base 35, and on the other hand when the jig base 35 moves relatively in the rear direction, since the front sides of the pair of right and left engaging pawls 42a, 42a are vertical planes, they are not lowered by the repulsive force of the repulsive springs 42b, 42b, thereby engaging and blocking the relative move of the jig base 35.

Corresponding to the engaging pawl mechanism 42 of the moving table 40, an advance recess 30a is opened backward at the rear end of the moving table 30 of the first air cylinder device 25.

The air cylinder 41 is provided at the opposite side in the lateral direction of the air cylinder 31, and specifically at the lower side position of the conveying rail 21, it is installed horizontally on the conveying section platform 24, and its piston rod 41a is connected to the moving table 40 through a joint 43.

Thus, the first and second air cylinder devices 25, 26, having the air cylinders 31, 41 mutually interlocked and driven, send the honing jig 20 mounted on the conveying rail 21 to the specified position, that is, the processing position of the honing machine 5 and the measuring position of the detecting device 6 in cycle operation.

Figure 6:
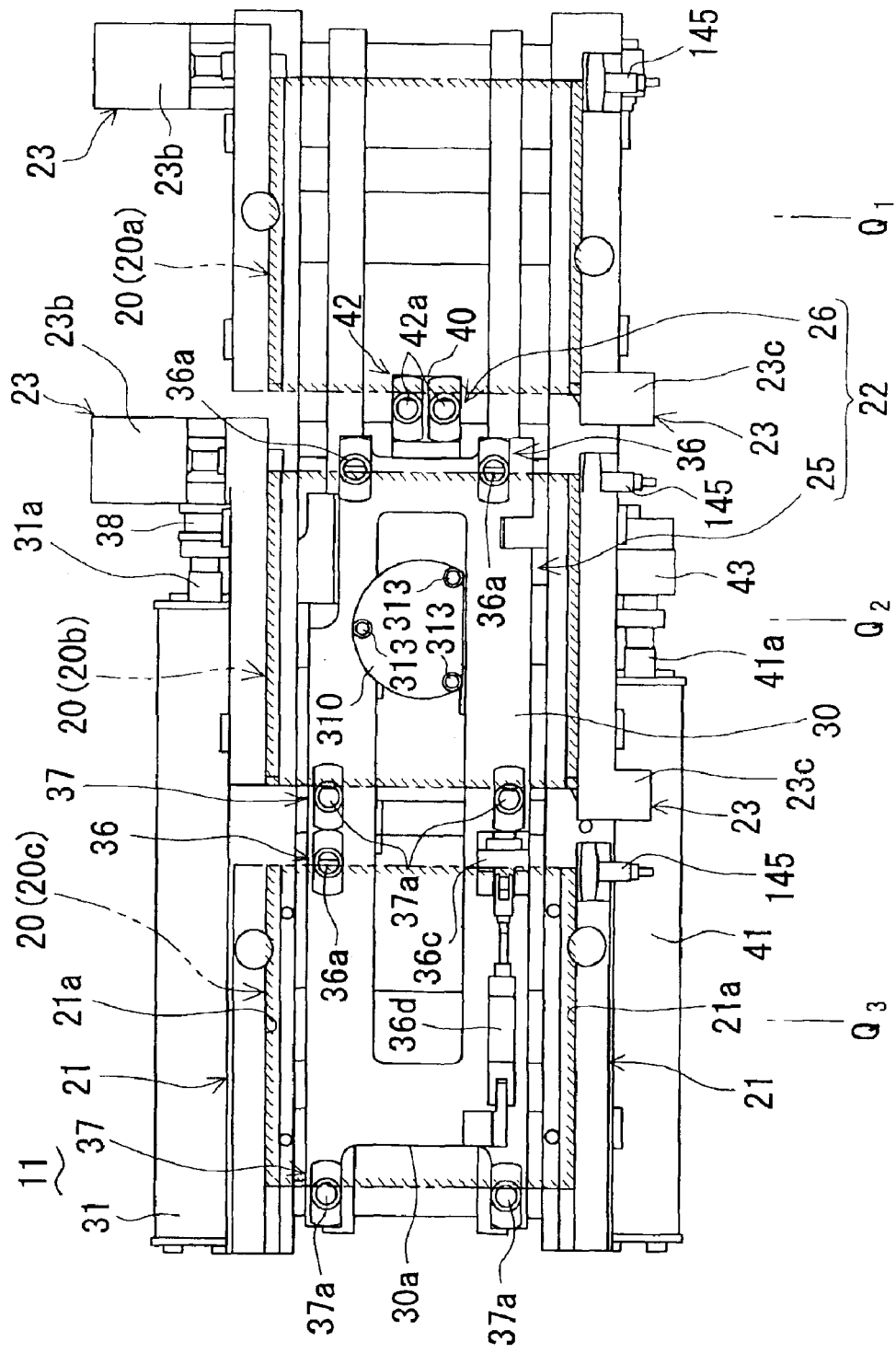
FIG. 6 is a plan view showing a state of removing a lock device of the conveying section of conveying device of the processing cell.
Figure 7:
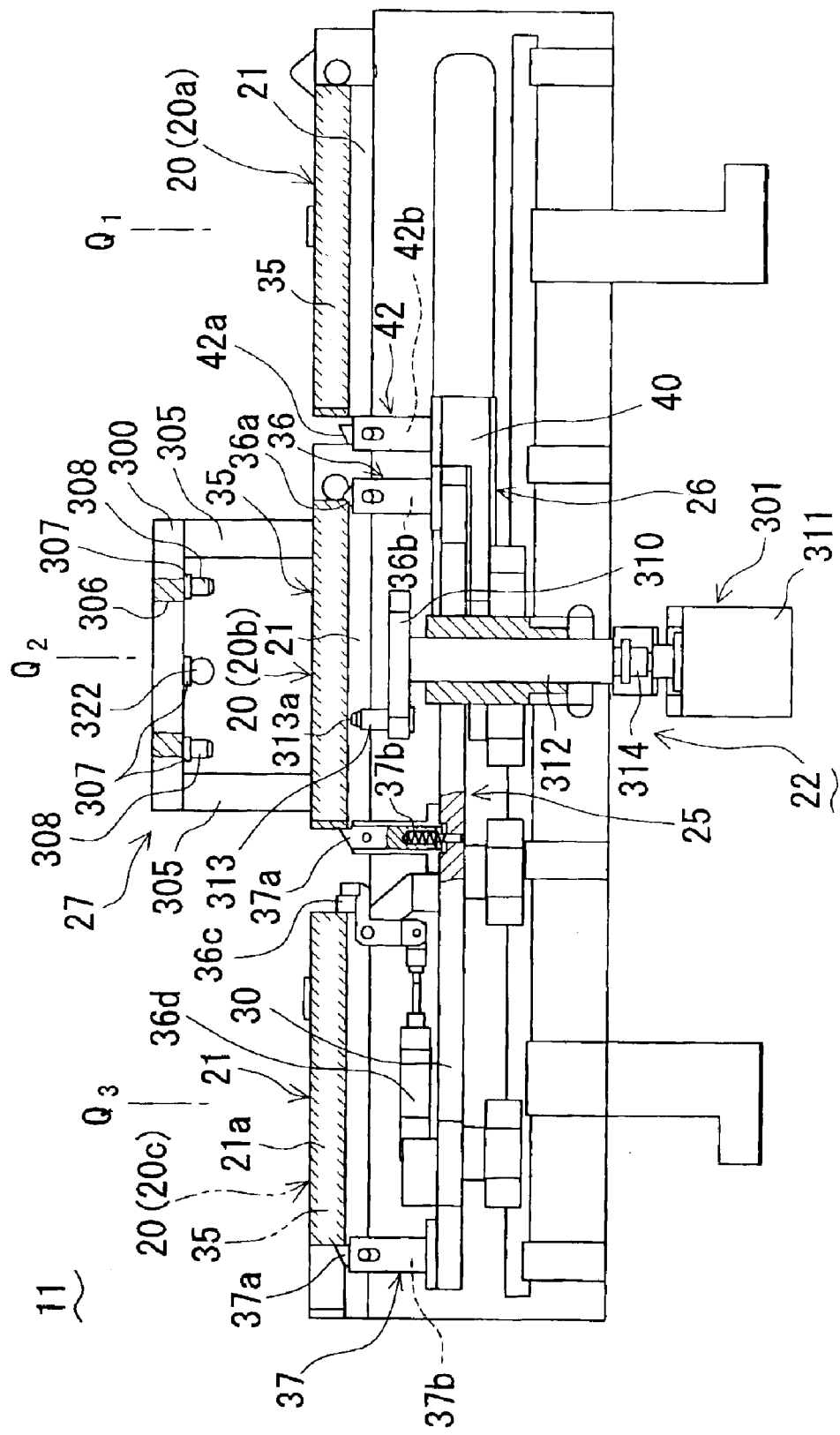
FIG. 7 is a side view showing a partial section of the conveying section.

Specifically, when the piston rods 31a, 41a of the air cylinders 31, 41 of the first and second air cylinder devices 25, 26 are at retract position, the front, neutral, and rear honing jigs 20a, 20b, 20c are respectively at the measuring position of the detecting device 6a (position $Q_1$ in FIG. 5 to FIG. 7), processing position of the accuracy boring machine 5a (position $Q_2$ in FIG. 5 to FIG. 7), and waiting position (position $Q_3$ in FIG. 5 to FIG. 7). At this time, the front and ear honing jigs 20a, 20b at the measuring position $Q_1$ and processing position $Q_2$ are positioned and held by the positioning devices 23, 23, and the rear honing jig 20c at the waiting position $Q_3$ is positioned and held by the rear side jig base holding structure of the moving table 30.

From this state, the positioning and holding state by the positioning devices 23, 23 is cleared, and the piston rods 31a, 41a of the air cylinders 31, 41 project and operate sequentially.

First, (1) the piston rod 41a of the air cylinder 41 projects and operates, and the front honing jig 20a is sent in cycle operation to the waiting position (position $Q_3$ in FIG. 16 and FIG. 17) of the forward processing cell described below (in this case, processing cell $A_2$).

In succession, (2) the piston rod 31a of the air cylinder 31 projects and operates, and the neutral and rear honing jigs 20b, 20c are sent out from the processing position $Q_2$ and waiting position $Q_3$ to the measuring position $Q_1$ and processing position $Q_2$ respectively in cycle operation. The neutral and rear honing jigs 20b, 20c sent to the measuring position $Q_1$ and processing position $Q_2$ are positioned and held by the positioning device 23, and the rear honing jig 20c at the processing position $Q_2$ is further locked and fixed in motion completely by the lock device 27.

The positioning and holding state by the positioning devices 23, 23 is maintained, and the positioning and holding state by the rear side jig base holding structure of the moving table 30 is cleared, and then the piston rods 31a, 41a of the air cylinders 31, 41 retract and operate sequentially.

That is, (3) the air cylinder 31 retracts up to the retract position, and the neutral and rear honing jigs 20a, 20b are positioned and held at the respective positions by the positioning device 23, and only the moving table 30 moves back to the position shown in FIG. 6 and FIG. 7, and the rear side jig base holding structures 36, 37 in the first air cylinder device 25 are engaged with the jig base 35 of the succeeding honing jig 20 waiting at the waiting position $Q_3$, while the front side jig base holding structures 36, 37 are engaged with the jig base 35 of the rear honing jig 20c at the processing position $Q_2$.

Then, (4) as the air cylinder 41 retracts up to the retract position, the engaging pawl mechanism 42 in the second air cylinder device 26 is engaged with the rear side edge of the jig base 35 of the neutral honing jig 20b at the measuring position $Q_1$ of the detecting device 6a.

In this relation, at a proper position of the conveying rail 21, a proximity switch 145 is provided for detecting the honing jig 20 at the measuring position $Q_1$, processing position $Q_2$, and waiting position $Q_3$.

Figure 8:
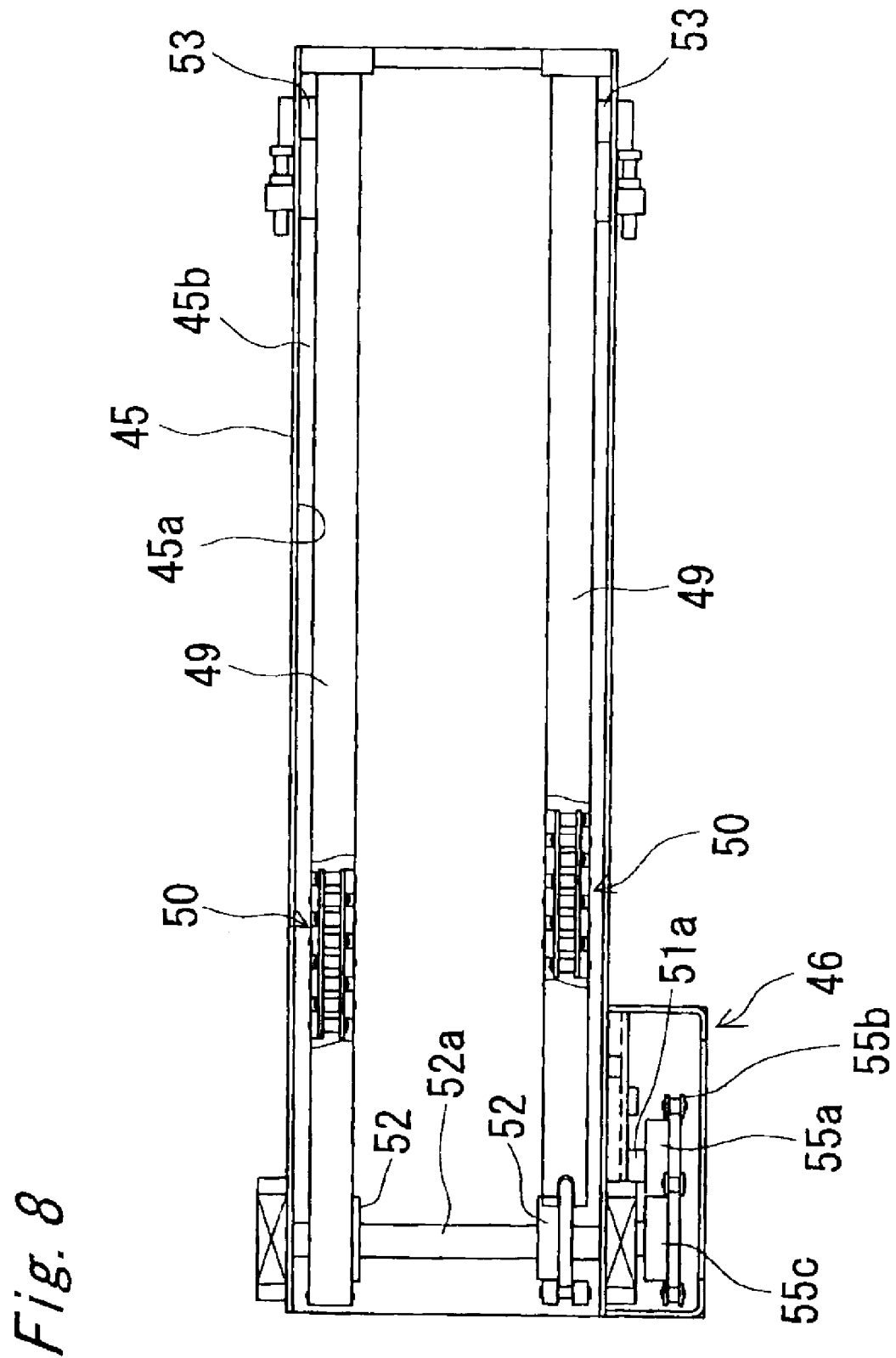
FIG. 8 is a plan view showing a return section of the conveying device of the processing cell.
Figure 9:
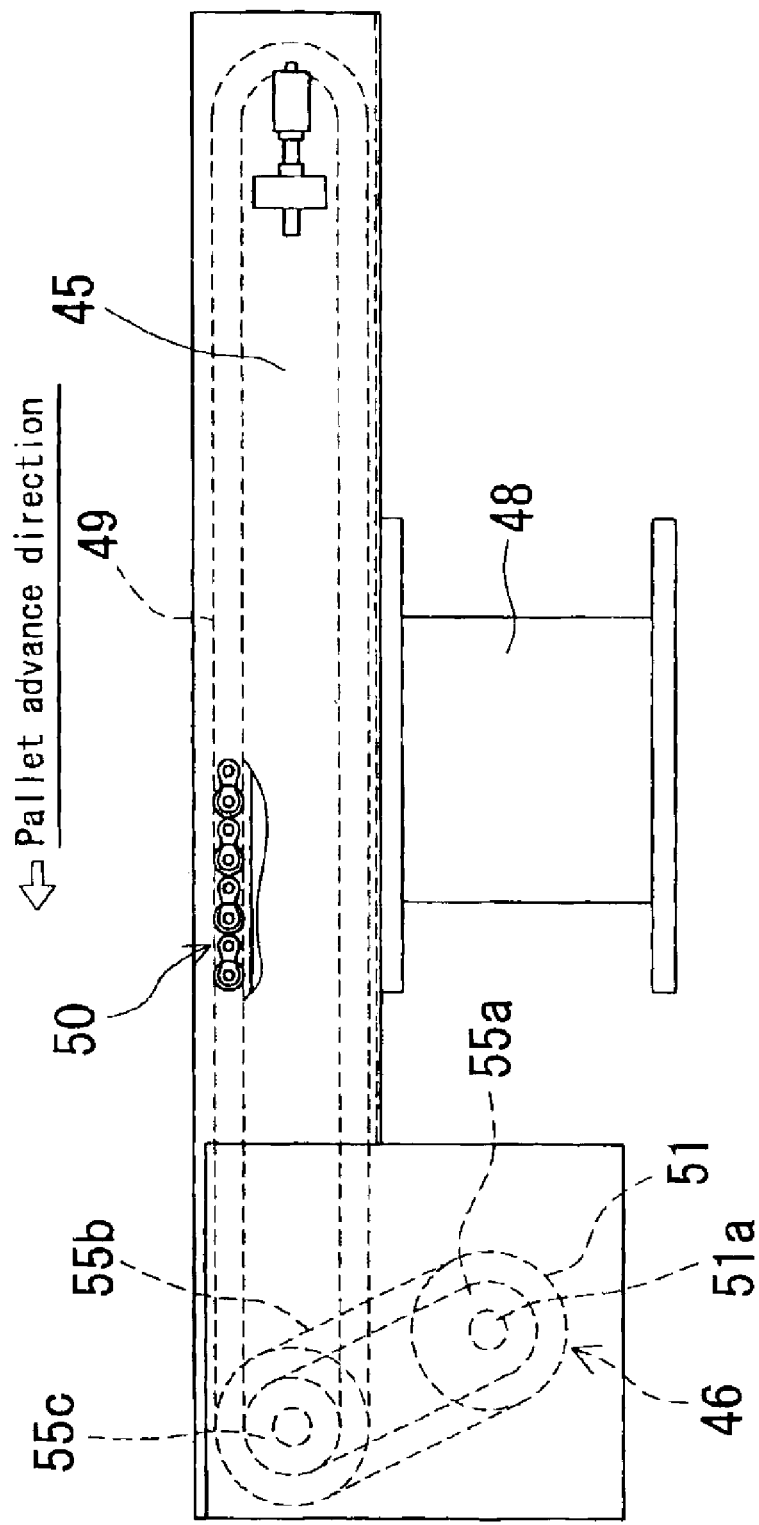
FIG. 9 is a partially cut-away side view of the return section.
Figure 10:
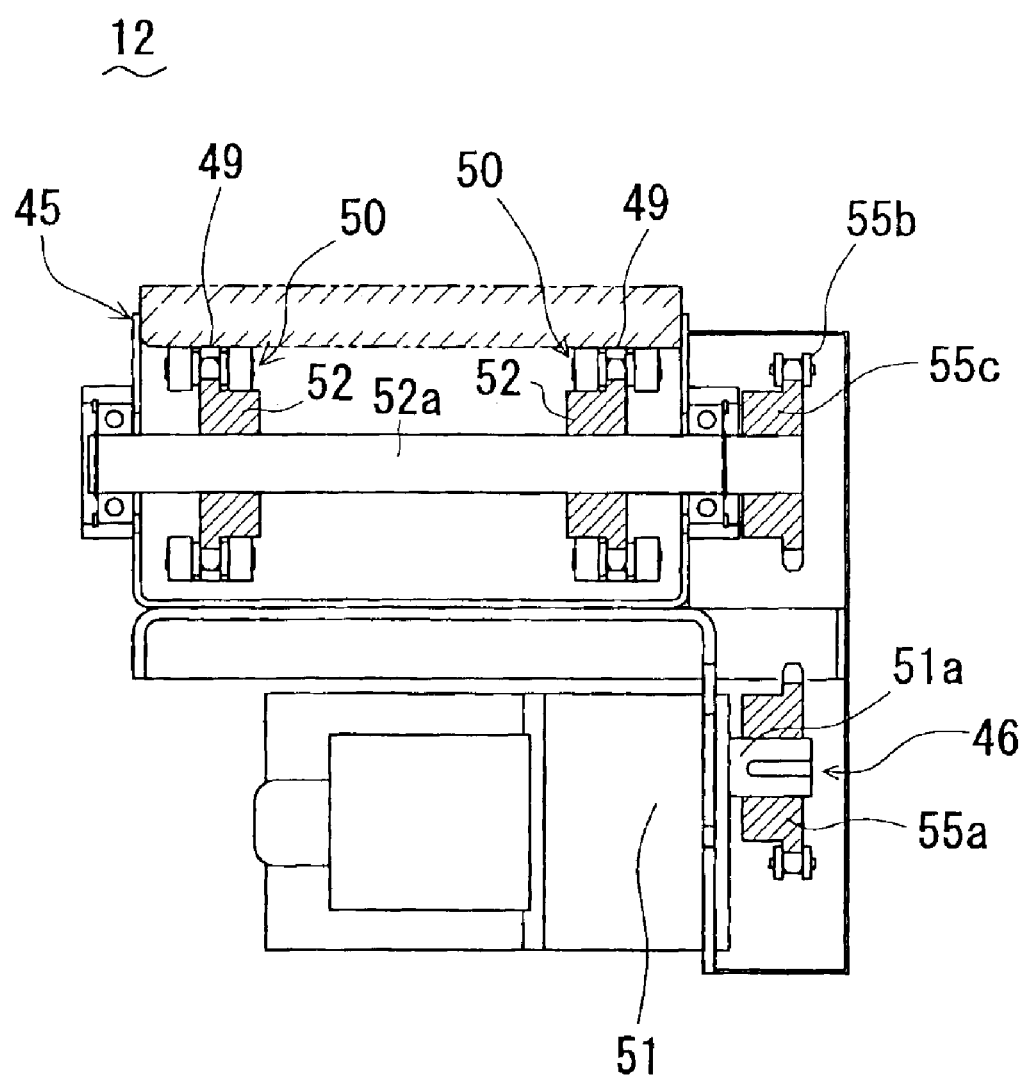
FIG. 10 is a front view showing the return section.

The return section 12 comprises a return rail 45 and a work return device (work returning means) 46 as shown in FIG. 8 to FIG. 10, and they are provided on a return section platform 48. The return rail 45 for composing the return section 12 functions, as mentioned below, as the installation reference of the processing cell $A_1$ together with the conveying rail 21 of the conveying section 11, and also has a structure capable of inverting the flow direction of works W normally and reversely.

The return rail 45 is for mounting and guiding the honing jig 20 for accommodating and holding the works W after the machining process, and is shaped like a straight guide rail having a guide groove 45a for guiding the honing jig 20 as shown in FIG. 8 and FIG. 9, and in the illustrated embodiment, it also serves as the guide running surface of the work return device 46.

The work return device 46 is for returning the honing jig 20 mounted on the return rail 45, and is specifically composed of an endless conveying device for conveying the honing jig 20 in an endless operation. In the illustrated embodiment, it is composed of a conveying device 46 of roller chain type.

This conveying device 46 comprises a pair of roller chains 50, 50 for mounting and conveying the jig base 35 of the honing jig 20, while running on a pair of roller chain holders 49, 49, and a drive motor 51 for running and driving the roller chains 50, 50.

The roller chain 50 is wound on a sprocket wheel 52 and a tension guide 53, and is disposed so as to run freely on the roller chain holder 49 laid on the return rail 45. By rotation of the drive motor 51, the roller chain 50 supports and runs on the bottom of the jig base 35 of the honing jig 20.

The drive motor 51 is fitted and fixed to the return section platform 48, and its drive shaft 51a is driven and coupled to a support shaft 52a of the sprocket wheels 52, 52 through a sprocket wheel 55a, a transmission roller chain 55b, and a sprocket wheel 55c.

Instead of the conveying device 46 of roller chain type, a conveying device of conveying belt may be also employed.

Figure 11:
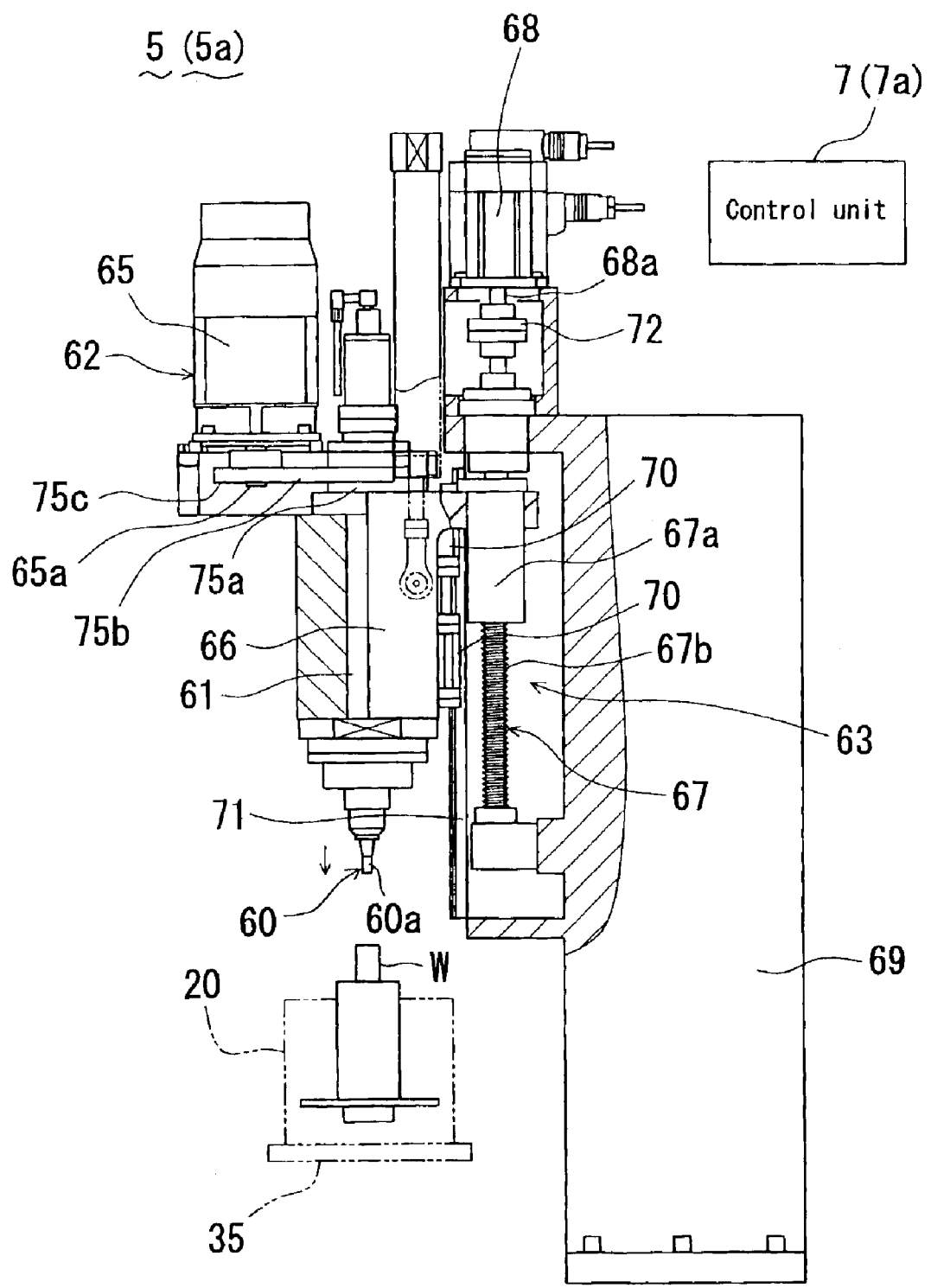
FIG. 11 is a schematic structural diagram showing a partial section of the accuracy boring machine of the automatic honing system.

The accuracy boring machine 5a is specifically a vertical type as shown in FIG. 11, and mainly comprises a rotary spindle 61 having a boring bar 60 at the leading end, a principle rotation drive unit (spindle rotating means) 62, a spindle feed drive unit (spindle feeding means) 63, and control unit (controlling means) 7a.

The boring bar 60 cuts and processes the inner surface of the hole in the work W, and is detachably fitted to the leading end, that is, the lower end of the rotary spindle 61, and a boring tool 60a is detachably fitted to the leading end portion. This boring tool 60a is a cemented carbide tool or a diamond tool, and is properly selected depending on the processing conditions of the inner surface of the hole in the work W.

The rotary spindle 61 has the boring bar 60 provided at its lower end, and is coupled to the spindle rotary drive unit 62 including the drive motor 65 and others, and the spindle feed drive unit 63 including a slide main body 66, a feed screw mechanism 67, a drive motor 68 and others.

That is, the rotary spindle 61 is rotatably supported on the slide main body 66, and this slide main body 66 is elevatably disposed on a linear rail 71 extending in the vertical direction of the machine body 69 through linear guides 70, 70. The slide main body 66 is coupled to a nut 67a of the feed screw mechanism 67 provided in the main body 69. This feed screw mechanism 67 is specifically composed of a ball screw, and its screw 67b is coupled to the motor shaft 68a of the drive motor 68 through a coupling 72.

By rotation of the drive motor 68, the feed screw mechanism 67 operates to feed, and together with the slide main body 66, the rotary spindle 61, that is, the boring bar 60 moves in the axial direction of the inner surface of the hole of the work W (feed action).

A transmission pulley 75a is provided at the upper end of the rotary spindle 61, and this transmission pulley 75a is coupled to a transmission pulley 75c attached to the motor shaft 65a of the drive motor 65 through a transmission belt 75b.

By rotation of the drive motor 65, the rotary spindle 61, that is, the boring bar 60 rotates about the axial line through transmission mechanisms 75a to 75c.

In the boring machine 5a, the boring tool 60a is fixed at the leading end of the boring bar 60, but the boring tool 60a maybe fitted in the boring bar 60 to be free to project or retract, and tool cutting means may be also disposed to provide the boring tool 60a with a specified cutting action.

The control unit 7a automatically controls the operation of each drive unit of the accuracy boring machine 5a by interlocking mutually, and is specifically composed of a microcomputer composed of CPU, ROM, RAM, and I/O port, and a specified machining program for executing the boring process is incorporated. Reference numeral 81 is an operation panel for setting and manipulating the control unit 7a.

In the accuracy boring machine 5a thus composed, its drive units 65, 68 are mutually related with the control unit 7a, and controlled automatically, and the prepared hole in the work W conveyed in the work conveying section 11 is bored.

Although not shown specifically, the accuracy boring machine 5a may comprise, same as in the prior art, a tool cutting mechanism (tool cutting means) for providing the boring tool 60a with a specified cutting operation so as to be coping flexibly with the changes of the inside diameter of the prepared hole of works W.

Figure 12:
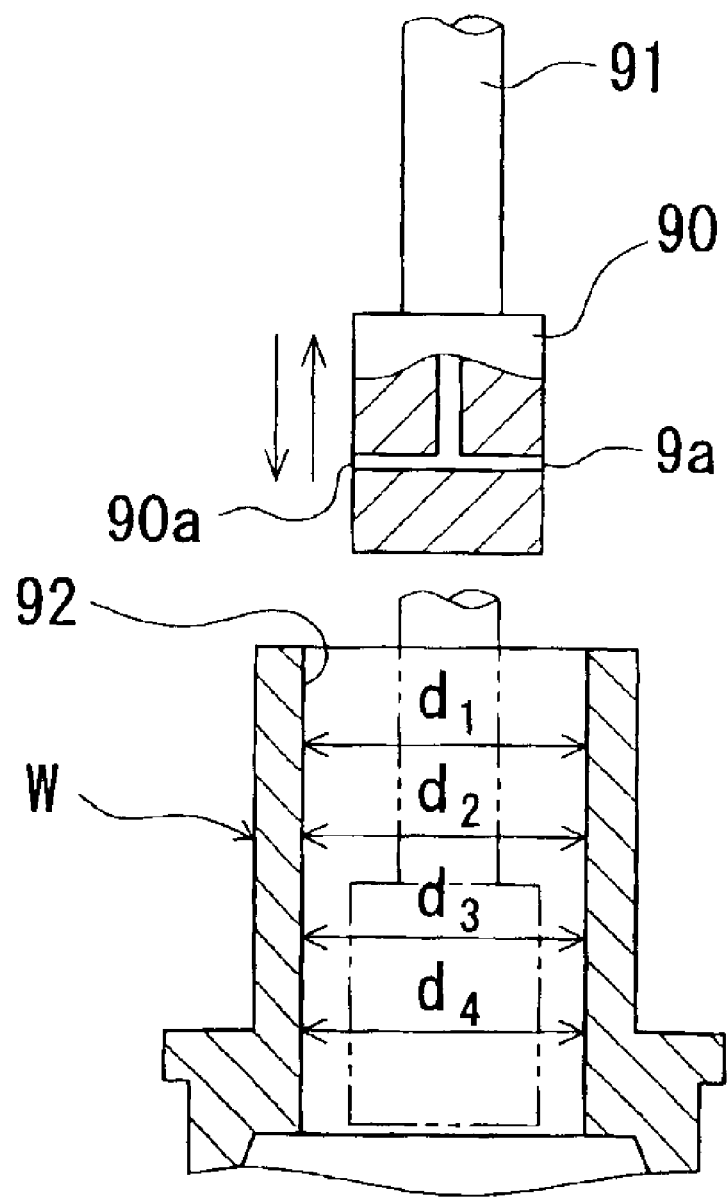
FIG. 12 is a longitudinal sectional view showing essential parts of the detecting device of the automatic honing system.

The detecting device 6a is to measure the processing diameter of the work W, and specifically comprises an air micrometer, and the measuring head 90 of the air micrometer is integrally fitted to the leading end (lower end) of the spindle 91 as shown in FIG. 12, and the spindle 91 is designed to move reciprocally in the axial direction, that is, the vertical direction of the processing hole 92 in the work W.

The measuring head 90 is cylindrical, having an outside diameter smaller than the inside diameter of the processing hole 92 of the work, and comprises air nozzles 90a, 90a for injecting the air for measurement outward in the diametral direction, disposed on the outer circumference.

In the state of the measuring head 90 inserted in the processing hole 92 in the work W, the air for measurement is projected from the air nozzles 90a, 90a, and the inside diameter of the processing hole 92 is measured by the change in the pressure of the air for measurement due to the gap between the inner circumference of the processing hole 92 and the outer circumference of the measuring head 90.

The number of inside diameters to be measured by the air micrometer is set depending on the length in the axial direction of the processing hole 92 as shown in FIG. 12. In the illustrated embodiment, inside diameters at four positions in the axial direction ($d_1$ to $d_4$) are measured in the processing hole 92, and these four measurements $d_1$ to $d_4$ are sent to the operation control unit of the air micrometer not shown, and the inside diameter shape mode of the processing hole 92 of the work W is comparatively operated.

From the result of operation, it is judged whether the inside diameter of the prepared hole of the processing hole 92 of the work W is within the allowable honing range, and if within the range, a command signal of honing execution is sent to the control units 7b, 7c of the honing machines 5b, 5c of the subsequent processing cells $A_2, A_3$, and if out of the range, a command signal not requesting honing is sent to the control units 7b, 7c of the honing machines 5b, 5c, and thereby the honing machines 5b, 5c are stopped.

Instead of the air micrometer, an electric micrometer may be used. Although not shown specifically, the configuration and action of the prepared hole detecting device 4 are same as in the detecting device 6a, and it is judged if the prepared hole inside diameter of the processing hole 92 of the work W before the boring process by the accuracy boring machine 5a is within the boring allowable range or not.

Figure 2:
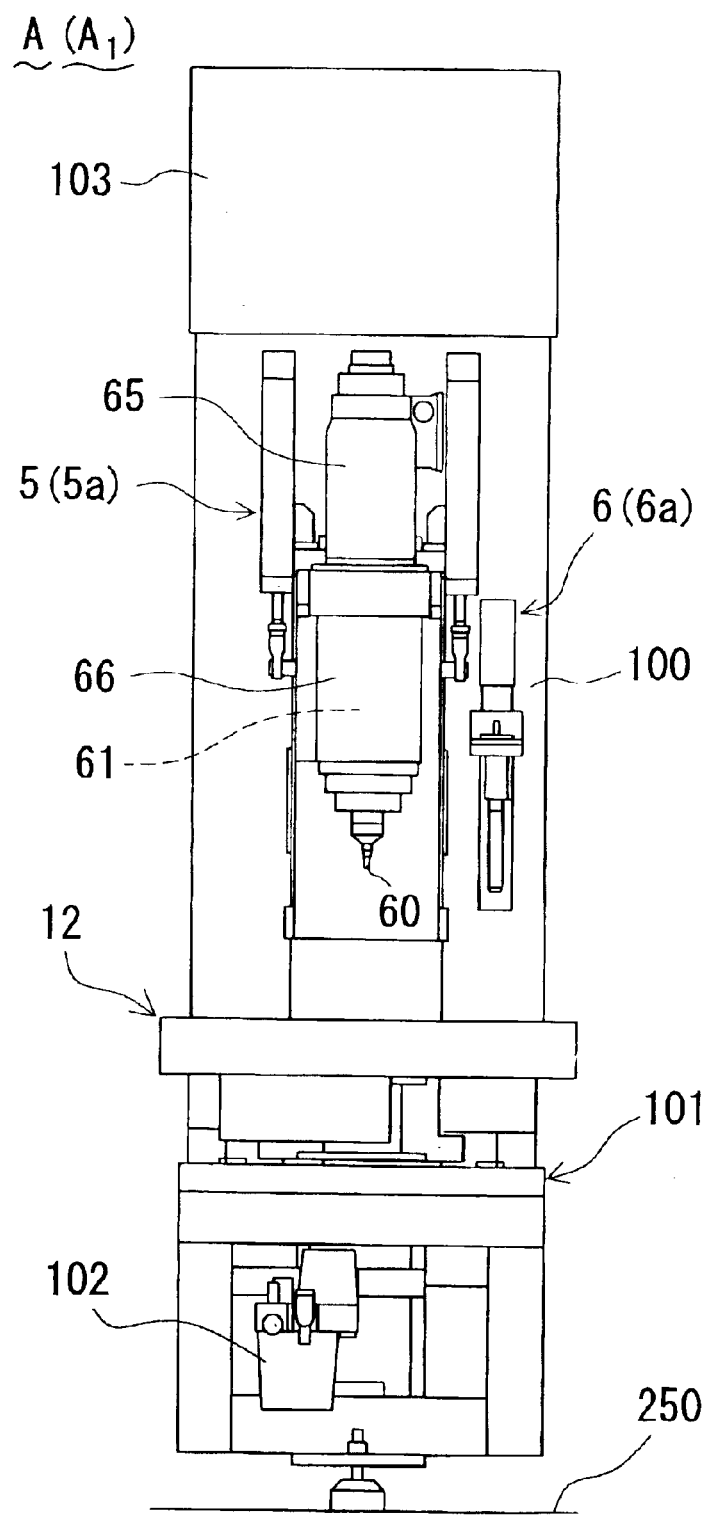
FIG. 2 is a front view showing a processing cell having a accuracy boring machine for composing honing section of the honing system.

As shown in FIG. 2 and FIG. 3, a control box 100 accommodating the control unit 7a is mounted on the top of the back side of the apparatus frame 101. An oil feed device 102 as the drive source of the processing cell $A_1$ is installed inside of the lower part of the apparatus frame 101, and a spindle cooler 103 for cooling the rotary spindle 61 and others necessary for processing is disposed on the control box 100, and a chip hopper 104 for collecting the machining chips is provided in the lower part of the back side of the apparatus frame 101.

The processing cells $A_2, A_3$ having the honing machines 5b, 5c are mutually identical in structure, and the principal portion composes a configuration common to the processing cells $A_1$ having the accuracy boring machine 5a mentioned above.

That is, the processing cells $A_2, A_3$ are composed in a unit structure, as shown in FIG. 13 to FIG. 20, comprising a conveying device 10 composing a part of the work conveying route 1, a single honing machine (machine tool) 5 (5b, 5c) a detecting device 6 (6b, 6c), and a control unit 7 (7b, 7c) for mutually linking them and controlling. Further, as described below, by properly setting the program composition of the control unit 7 (7b, 7c), the processing cell $A_2$ is composed for intermediate processing, and the processing cell $A_3$ for finishing.

The specific configuration of the conveying device 10, detecting device 6 (6b, 6c), and control unit 7 (7b, 7c) is substantially same as that of the processing cell $A_1$ mentioned above, and similar components and elements are identified with same reference numerals and detailed description is omitted, and major different points are specifically explained below.

Figure 20:
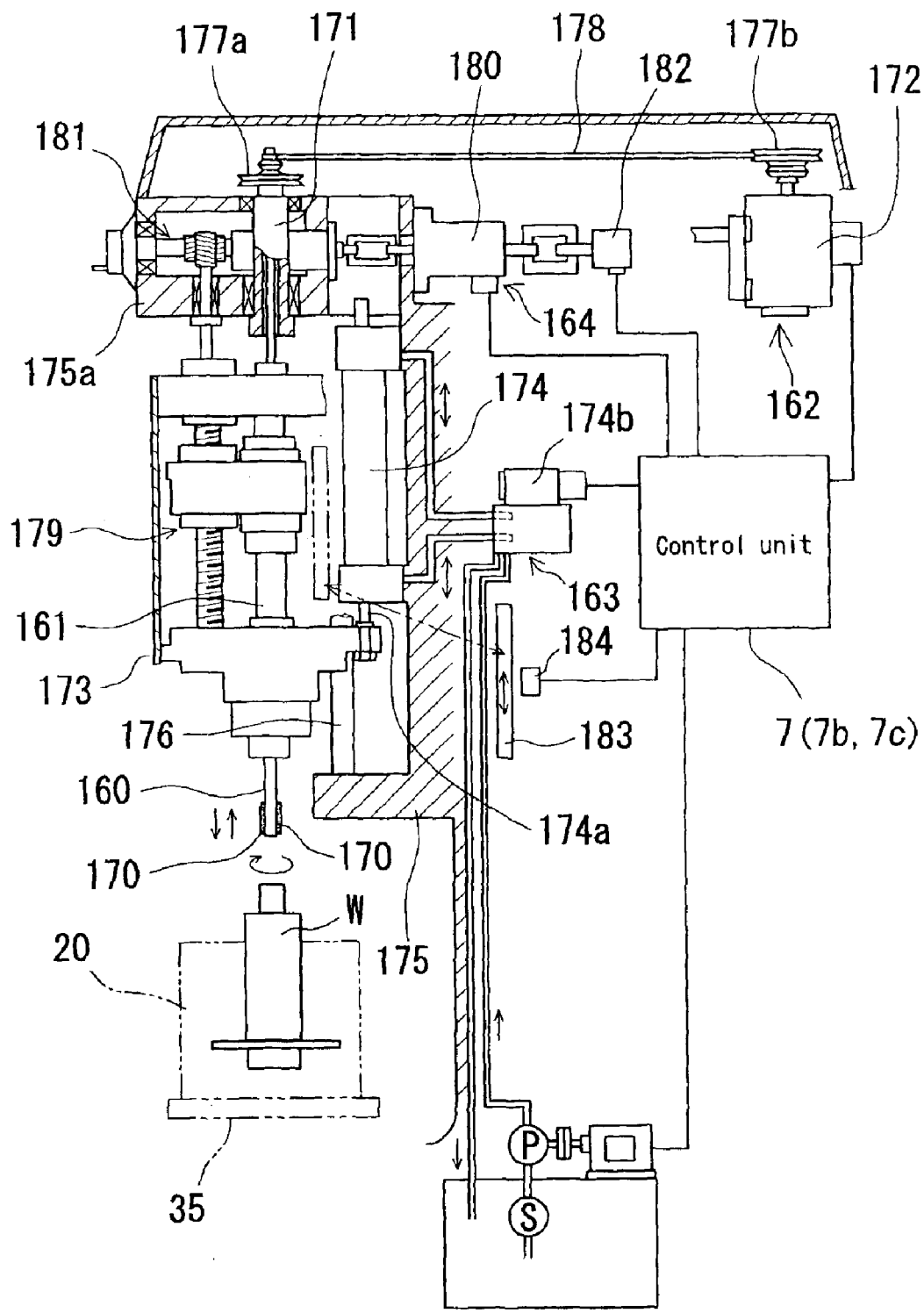
FIG. 20 is a schematic structural diagram showing a partial section of honing machine of the automatic honing system.

The honing machine 5 (5b, 5c) is a vertical type as specifically shown in FIG. 20, and mainly comprises a rotary spindle 161 having a honing tool 160 at the leading end, a spindle rotation drive unit (spindle rotating means) 162, a spindle reciprocal drive unit (spindle reciprocating unit) 163, a wheel drive unit (wheel driving means) 164, and a control unit (controlling means) 7 (7b, 7c).

The honing tool (so-called honing mandrel or honing head) 160 is detachably fitted to the leading end, that is, the lower end of the rotary spindle 161, and inside there are plural honing wheels 170,170, . . . disposed expandably in the diametral direction, a cone rod (not shown) for expanding them, and return springs (not shown) for returning these honing wheels 170, 170, . . . . The honing wheels 170, 170, . . . are expanded along with the descending motion of the cone rod, and are contracted by the return springs by the ascending motion of the cone rod.

The rotary spindle 161 has a honing tool 160 at its lower end, and is linked to the spindle rotary drive unit 162 including drive shaft 171, drive motor 172, and others, and the spindle reciprocal drive unit 163 including slide main body 173, hydraulic cylinder 174, and others.

That is, the rotary spindle 161 is rotatably supported on the slide main body 173, and this slide main body 173 is elevatably provided on a guide rod 176 extending in the vertical direction of the machine body 175, and is coupled to a piston rod 174a of a hydraulic cylinder 174 provided in the machine body 175.

As the piston rod 174a of the hydraulic cylinder 174 moves up and down, the rotary spindle 161, that is, the honing tool 160 is moved up and down through the slide main body 173.

The upper end of the rotary spindle 161 is key-fitted or spline-fitted to the drive shaft 171 provided rotatably on the head 175a of the machine body 175, and is coupled to the drive shaft 171, relatively movably in the vertical direction (axial direction) and rotatably integrally.

At the upper end of the drive shaft 171, a transmission pulley 177a is provided, and this transmission pulley 177a is coupled to a transmission pulley 177b provided on a motor shaft of the drive motor 172 through a transmission belt 178.

By rotation of the drive motor 172, the rotary spindle 161, that is, the honing tool 160 is driven through the drive shaft 171.

The wheel drive unit 164 is to apply cutting operation to the honing wheels 170, 170, . . . , and comprises a cone rod (not shown) of the honing tool 160, a cutting drive mechanism 179 for moving the cone rod up and down, and a servo motor 180 as the drive source.

The cutting drive mechanism 179 is a known structure, and is coupled to the motor shaft of the servo motor 180 through a rotary transmission mechanism 181 provided in the head 175a of the machine body 175. By normal rotation of the servo motor 180, the cutting drive mechanism 179 is driven, and the cone rod in the honing tool 160 moves downward, and the honing wheels 170, 170, . . . are expanded. On the other hand, by reverse rotation of the servo motor 180, the cone rod moves upward, and the honing wheels 170,170, . . . are contracted (return action) by the return spring in the honing tool 160.

The amount of rotation of the servomotor 180 for controlling the expanding or contracting amount of the honing wheels 170, 170, . . . is detected by a position detector 182 such as rotary encoder.

The control unit 7 (7b, 7c) mutually interlocks the actions of drive units of the honing machine 5 (5b, 5c) and controls automatically, and it is specifically composed of a microcomputer including CPU, ROM, RAM, and I/O port, and specified machining programs for executing the honing process are incorporated.

In the control unit 7 (7b, 7c), various devices are electrically connected, such as the drive motor 172, hydraulic control valve 174b of hydraulic cylinder 174, servomotor 180, position detector 182, position detector 184 for detecting the position of the slide main body 173 from the scale 183 provided in the slide main body 173, and other drive units, and the actual value information obtained from them is compared with the preset values, and the operation of the drive units 162 to 164 is driven on the basis of the result of the comparison.

In thus composed honing machine 5 (5b, 5c), its drive units 162, 163,164 are mutually related and controlled automatically by the control unit 7 (7b, 7c), and the works W being conveyed through the work conveying section 11 are honed. In this case, the honing machines 5b, 5c are designed to process by constant dimensions, that is, uniform honing with a specified in-feed in the entire honing region.

The result of operation on the basis of the measured values of the detecting device 6 (6b, 6c) of the processing cells $A_2$, $A_3$ is fed back to the control unit 7 (7b, 7c) of the honing machine 5 (5b, 5c), and the honing process is executed on the basis of this value. Further, the result of operation by the detecting device for finishing 6c is also sent to the work sorting device 331 of the delivery cell B as processing result of work W (OK signal if conforming, NG signal if rejected).

Figure 13:
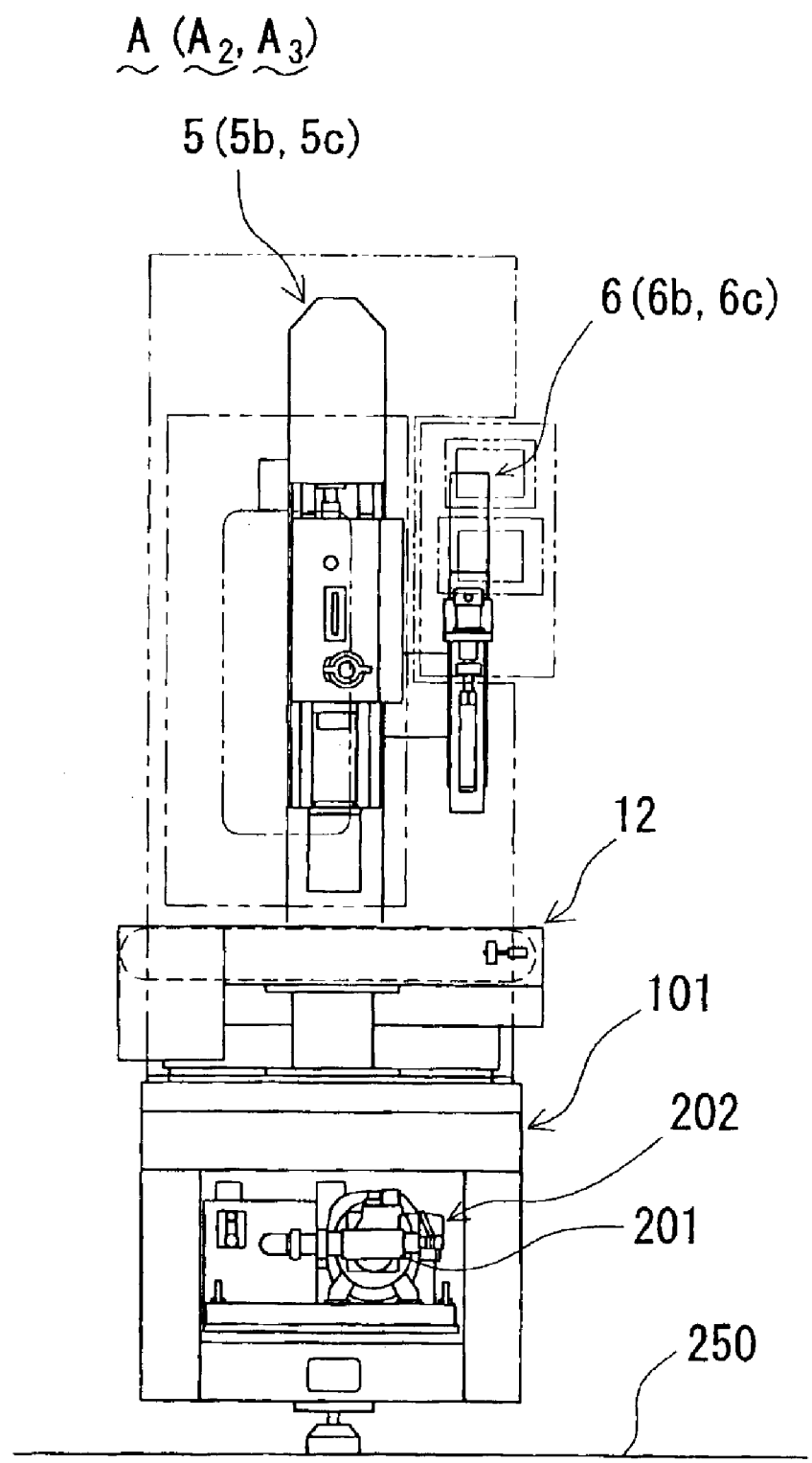
FIG. 13 is a front view by partial virtual line to show the processing cell having a honing machine for composing the honing section of the honing system.
Figure 14:
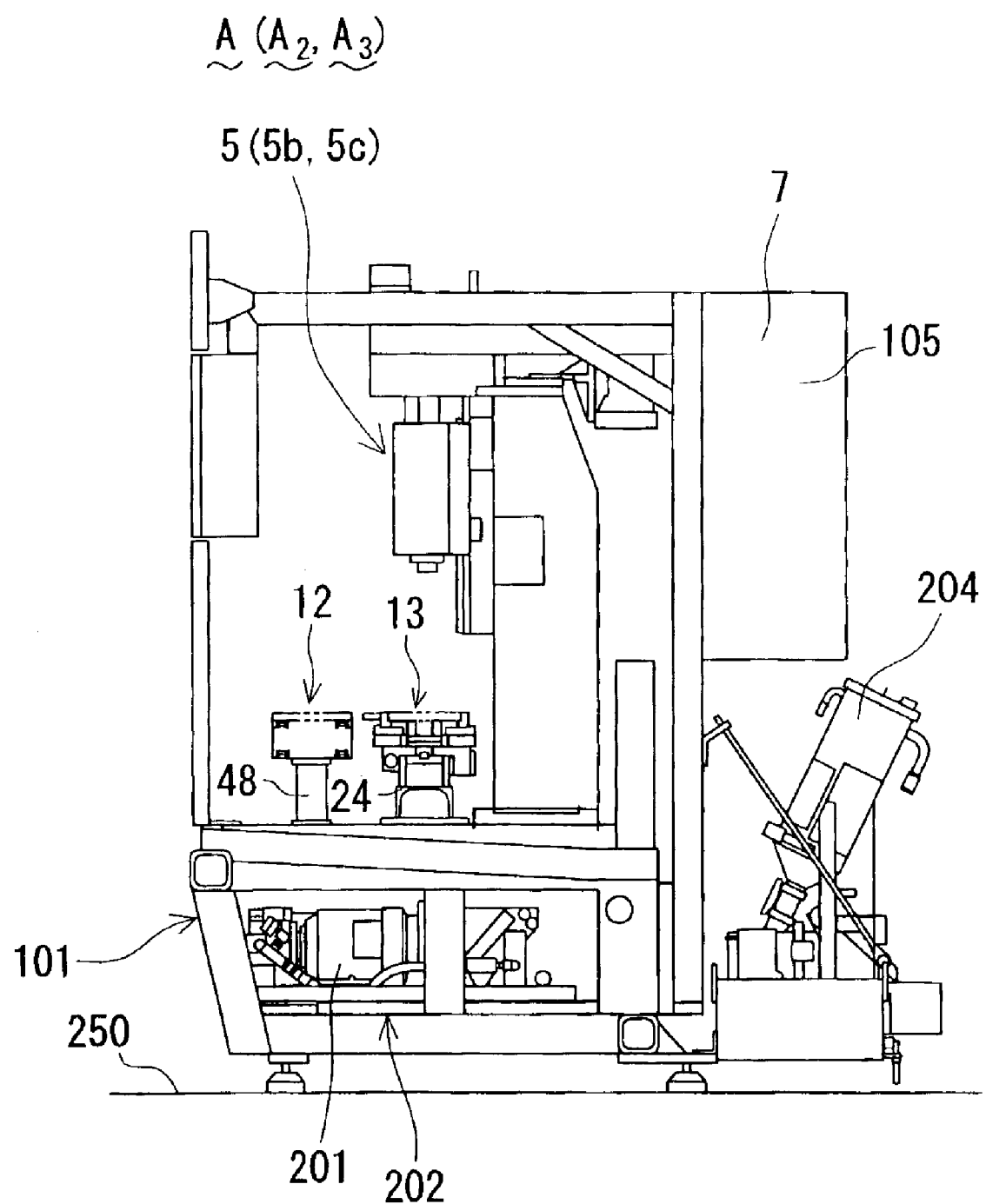
FIG. 14 is a side view showing the processing cell.
Figure 15:
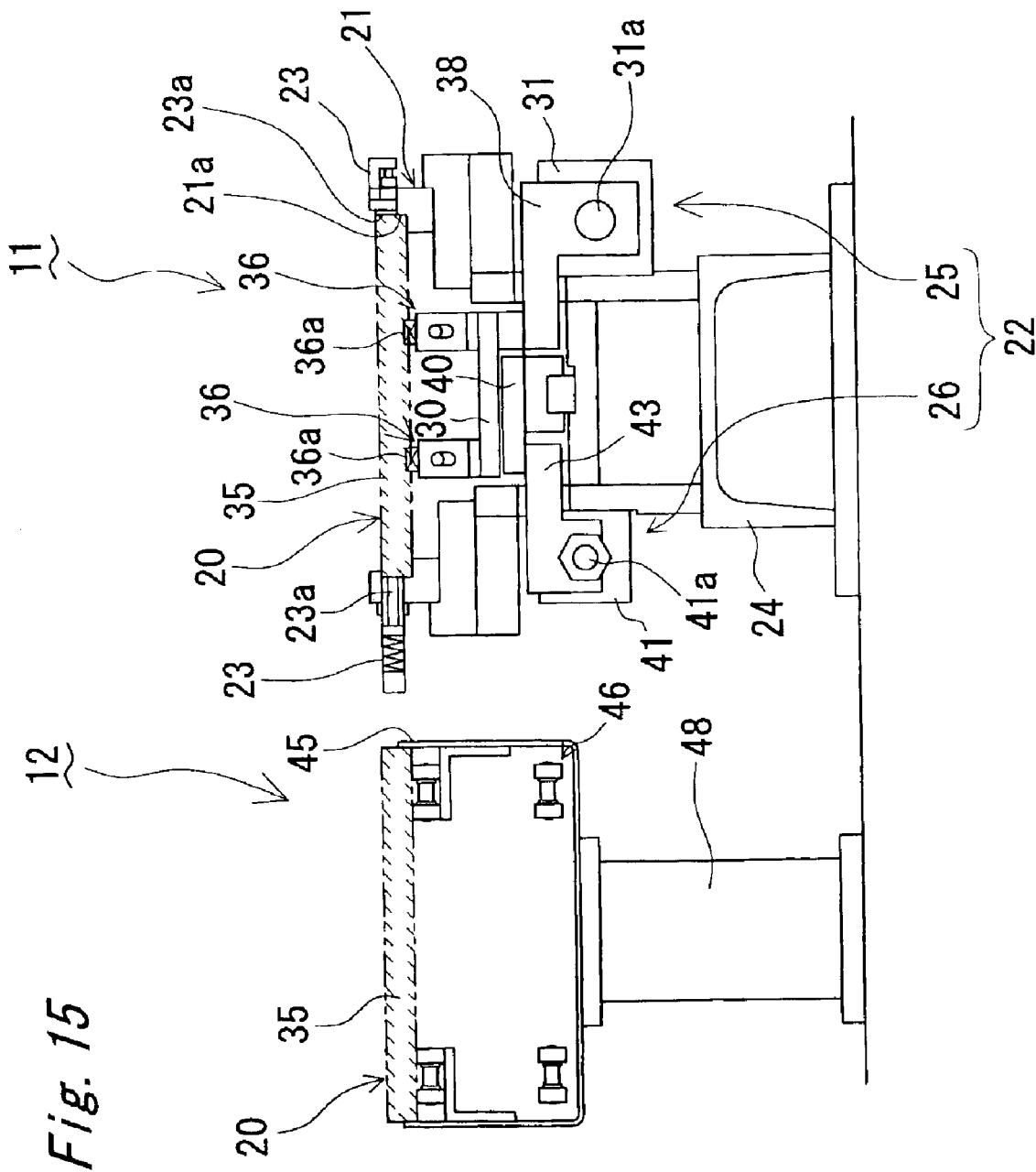
FIG. 15 is a magnified side view of lower part of the processing cell.
Figure 16:
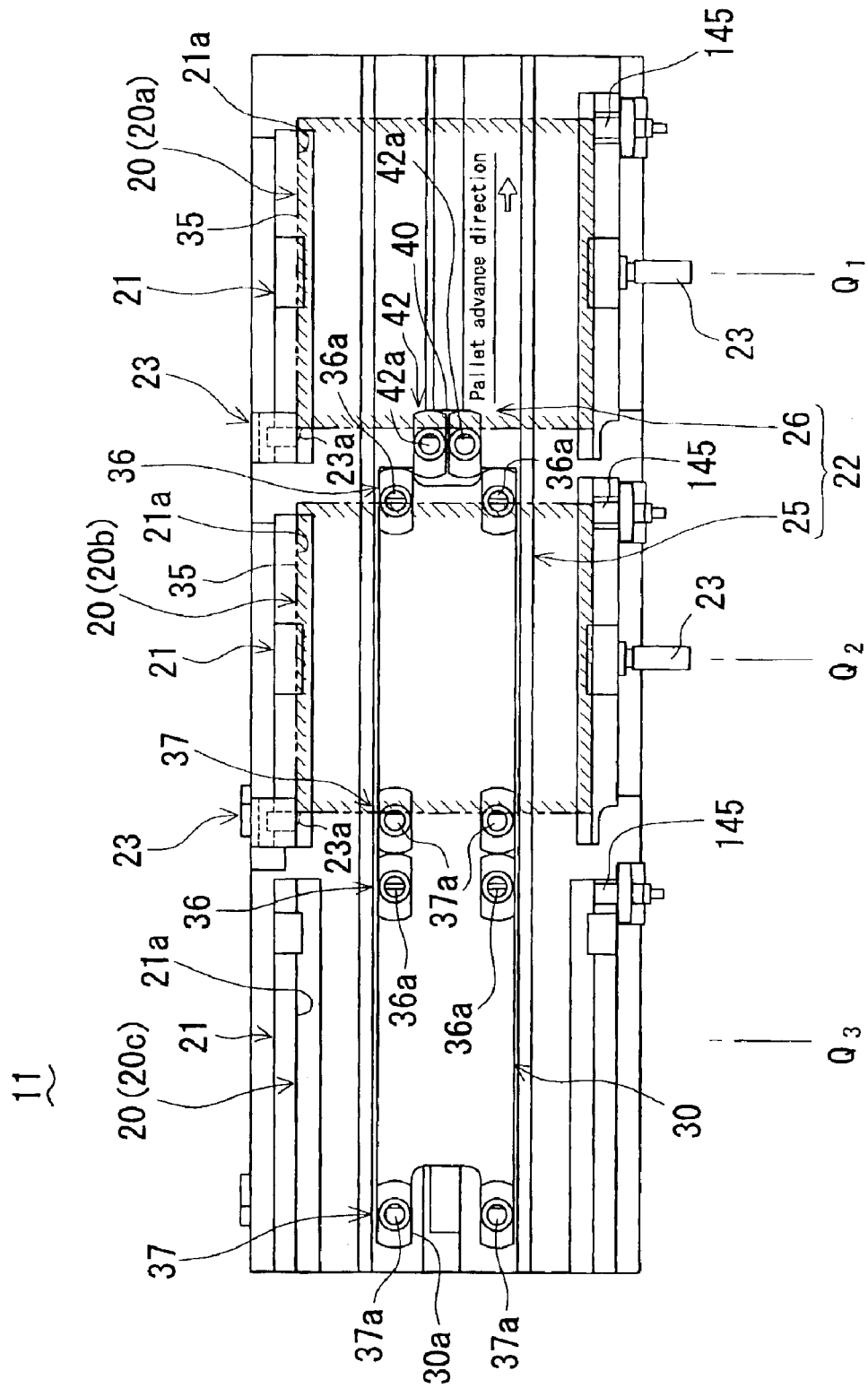
FIG. 16 is a plan view showing the conveying section of the conveying device of the processing cell.
Figure 17:
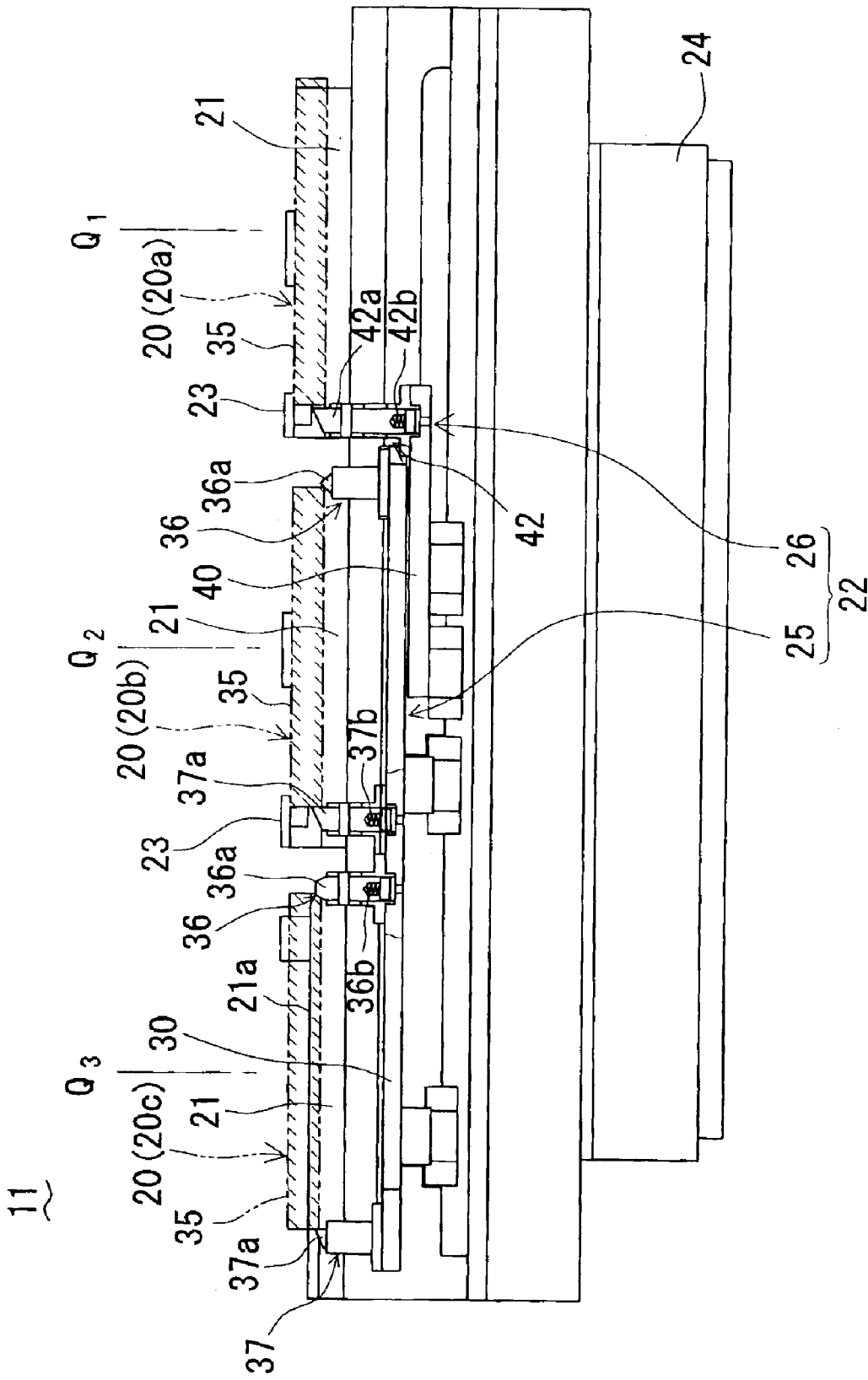
FIG. 17 is a side view showing a partial section of the conveying section.
Figure 18:
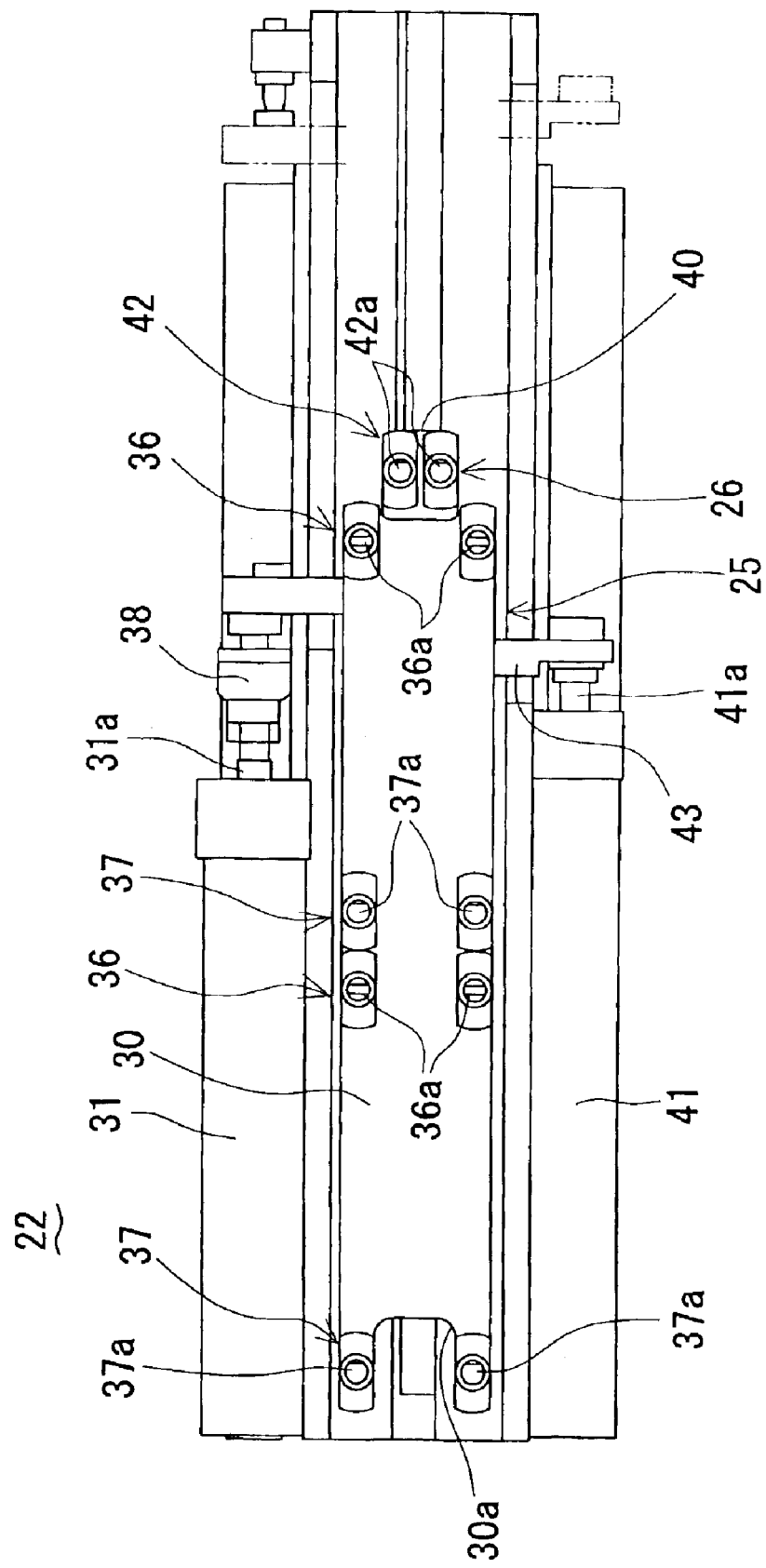
FIG. 18 is a partially cut-away plan view of the conveying section.
Figure 19:
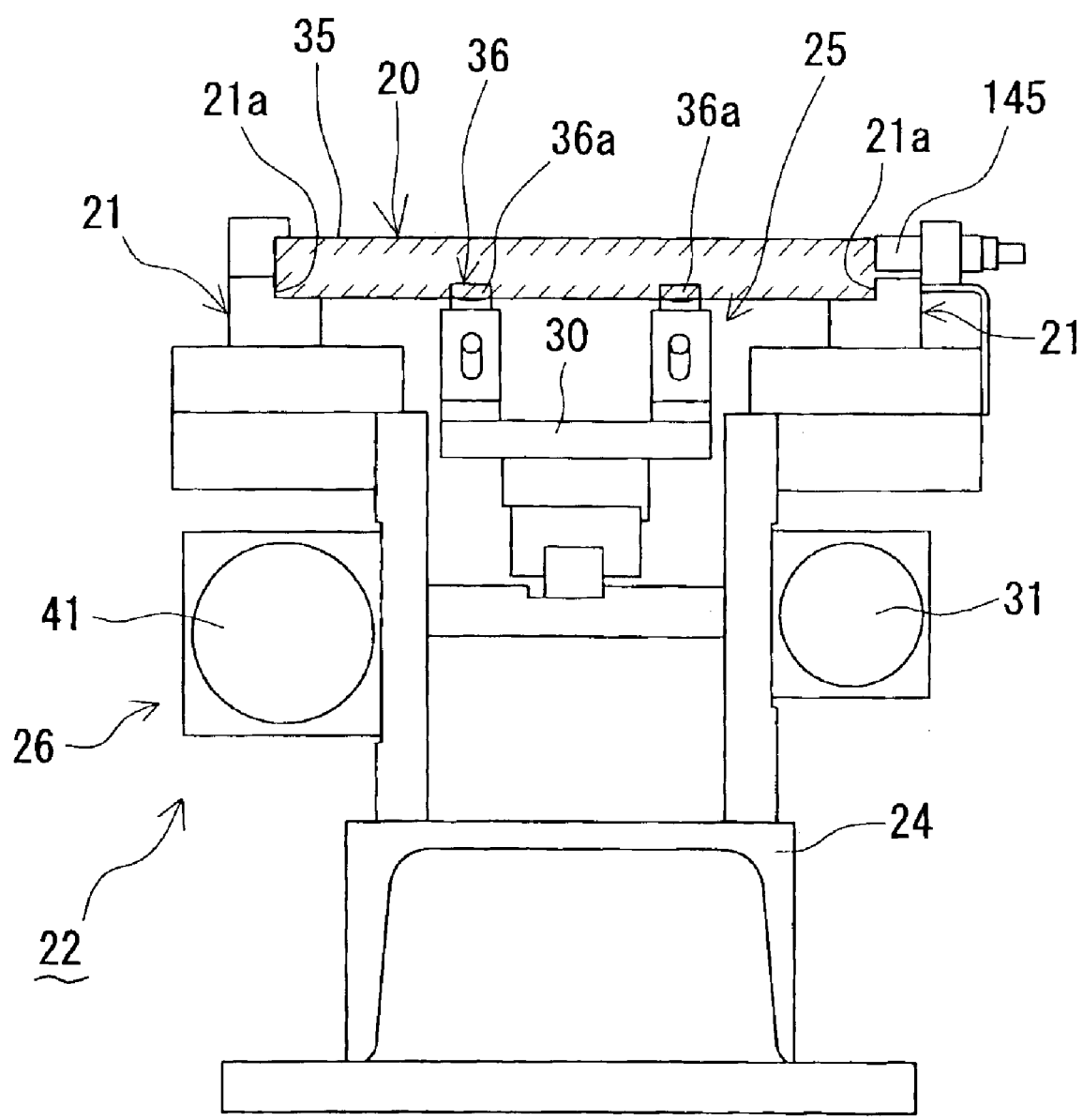
FIG. 19 is a front view showing the conveying section.

As shown in FIG. 13 and FIG. 14, a hydraulic unit 202 including a working fluid tank 201 as the drive source of the honing machine 5 (5b, 5c) of the processing cell A ($A_2$, $A_3$) is installed in the apparatus frame 101 of each processing cell A ($A_2$, $A_3$), and a coolant tank 204 for supplying coolant necessary for processing is installed in the lower part of the back side of the apparatus frame 101 of each processing cell A.

The processing cell A ($A_1$, $A_2$, $A_3$) having such configuration is connected and composed on the basis of the installation reference of at least either the conveying rail 21 of the conveying section 11 in the conveying device 10 or the return rail 45 of the return section 12.

In the illustrated embodiment, both rails 21, 45 function as the installation reference, and, referring to FIG. 1, in a state of the both rails 21, 45 being arrayed to compose a part of straight portion of the work conveying route 1, the processing cell A ($A_1$, $A_2$, $A_3$) is positioned and arranged on the installation floor 250, and the honing processing section of this automatic honing system is composed.

Thus, the plural processing cells A ($A_1$, $A_2$, $A_3$) are connected so as to be increased or decreased in number freely, and in the combined honing processing section, the control units 7a, 7b, 7c of the processing cells $A_1$, $A_2$, $A_3$ are mutually linked in a specified relation, and these processing cells $A_1$, $A_2$, $A_3$ are mutually interlocked, driven and controlled.

The processing cell A ($A_1$, $A_2$, $A_3$) is designed to invert the flow direction of works W normally and reversely.

Figure 21A:
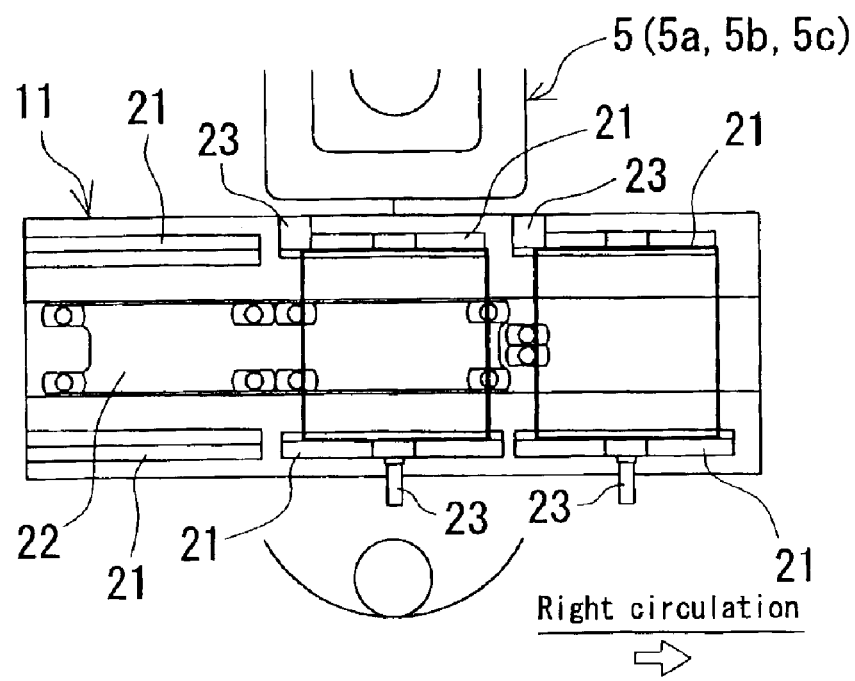
FIG. 21(a) shows right circulation.
Figure 21B:
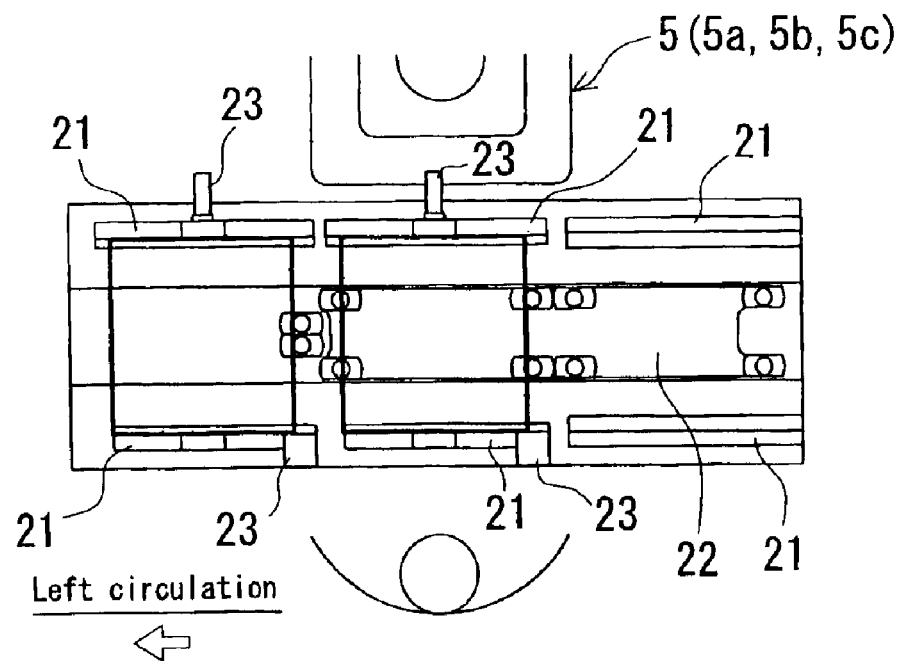
FIG. 21(b) shows left circulation.

That is, the conveying section 11 of the processing cell A (5a, 5b, 5c) has a detachable unit structure from the apparatus frame 103 as shown in FIGS. 21(a), (b), and by rotating the entire unit by 180° to invert the layout, the flow direction of works W is inverted (FIG. 21(a) shows right circulation, and FIG. 21(b) left circulation).

Figure 22A:
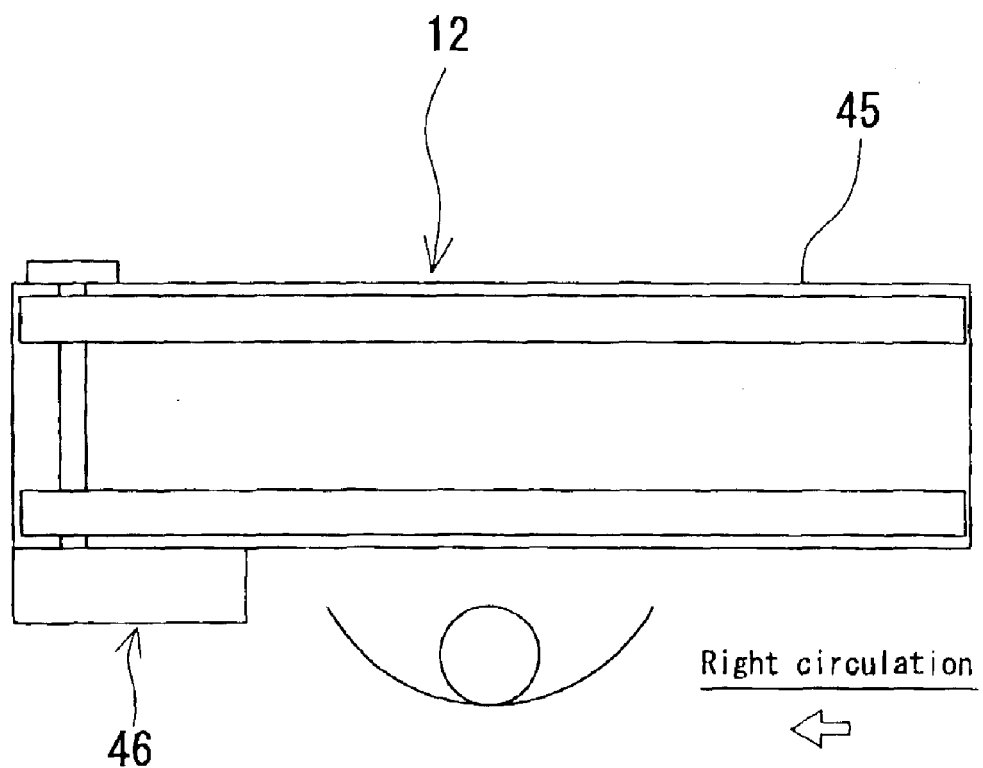
FIG. 22(a) shows right circulation.
Figure 22B:
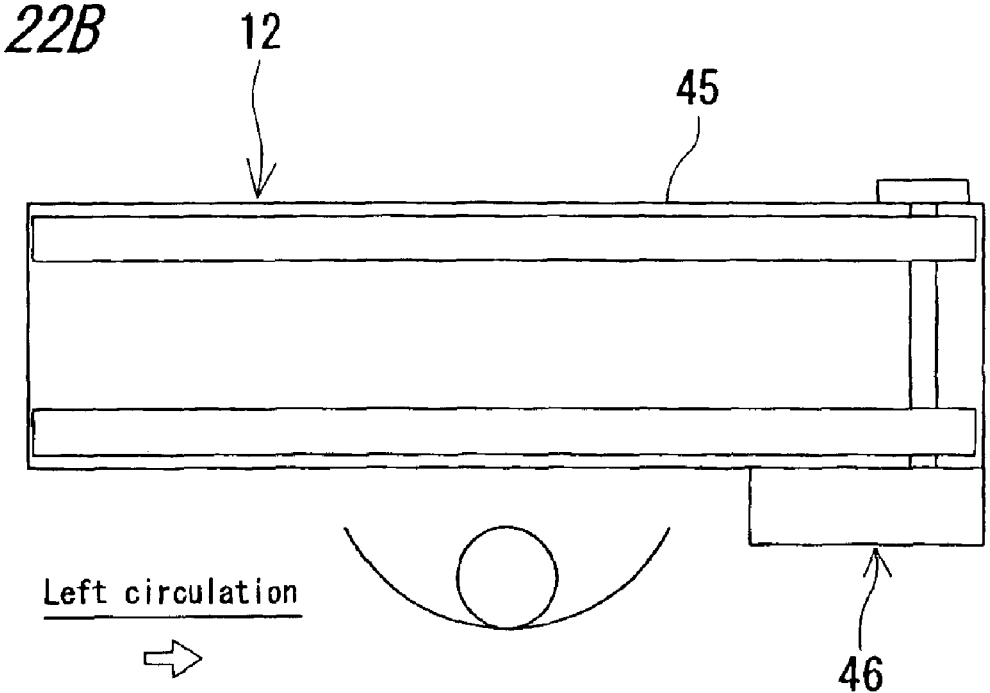
FIG. 22(b) shows left circulation.

The return section 12 of the processing cell A is also designed to invert the flow direction of works W normally and reversely (FIG. 21(a) shows right circulation, and FIG. 22(b) left circulation) as shown in FIGS. 22(a), (b).

Figure 23A:
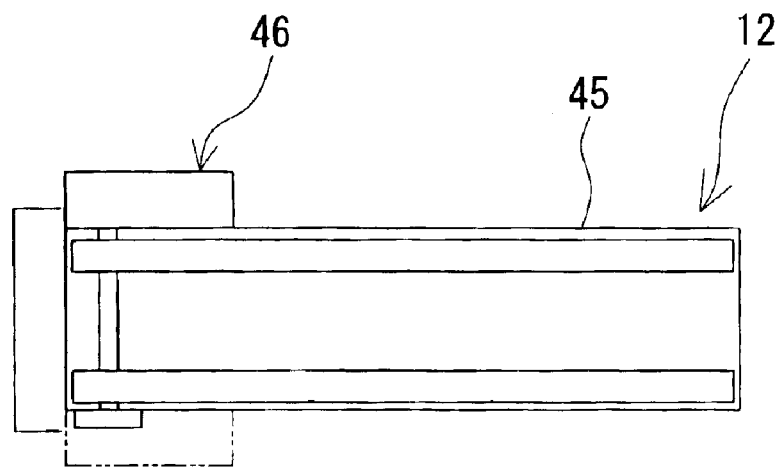
FIG. 23(a) is a plan view showing the combination changing procedure of the drive section of the work return device.
Figure 23B:
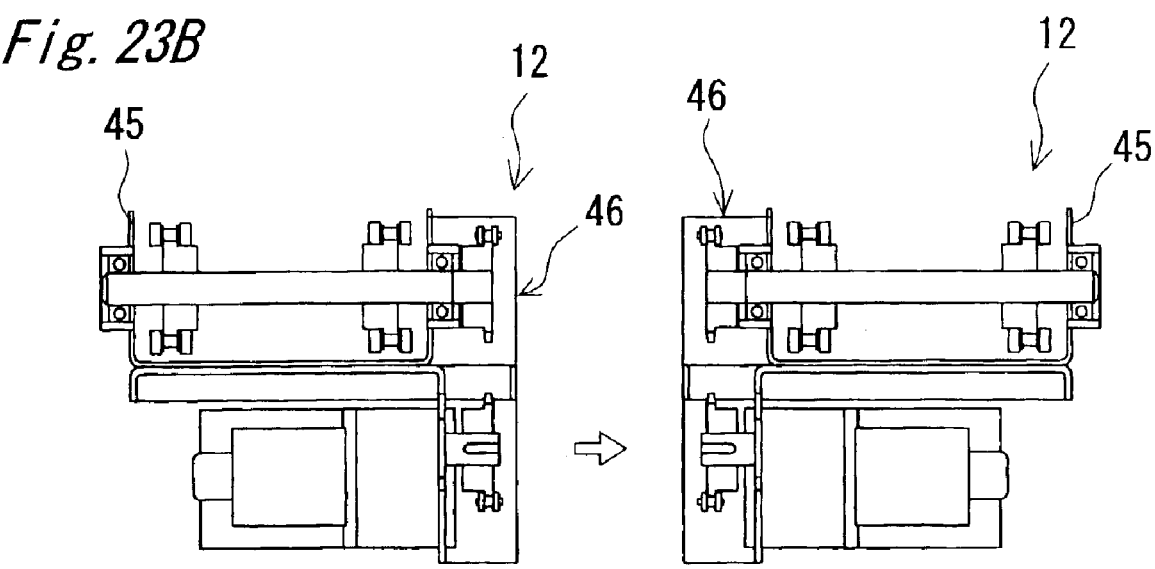
FIG. 23(b) is a front view of partial section of the combination changing procedure of the entire return section.

Specifically, as shown in FIG. 23(a), the drive section of the work return device 46 composed of drive motor 51 and others is designed to be changed in combination at right and left side. The return section platform 48 has a detachable unit structure from the apparatus frame 101 as shown in FIG. 23(b). As a result, after exchanging the drive section, only by rotating the entire unit by 180° to invert the layout, the flow direction of works W is inverted normally and reversely as shown in FIGS. 22(a), (b).

Figure 24A:
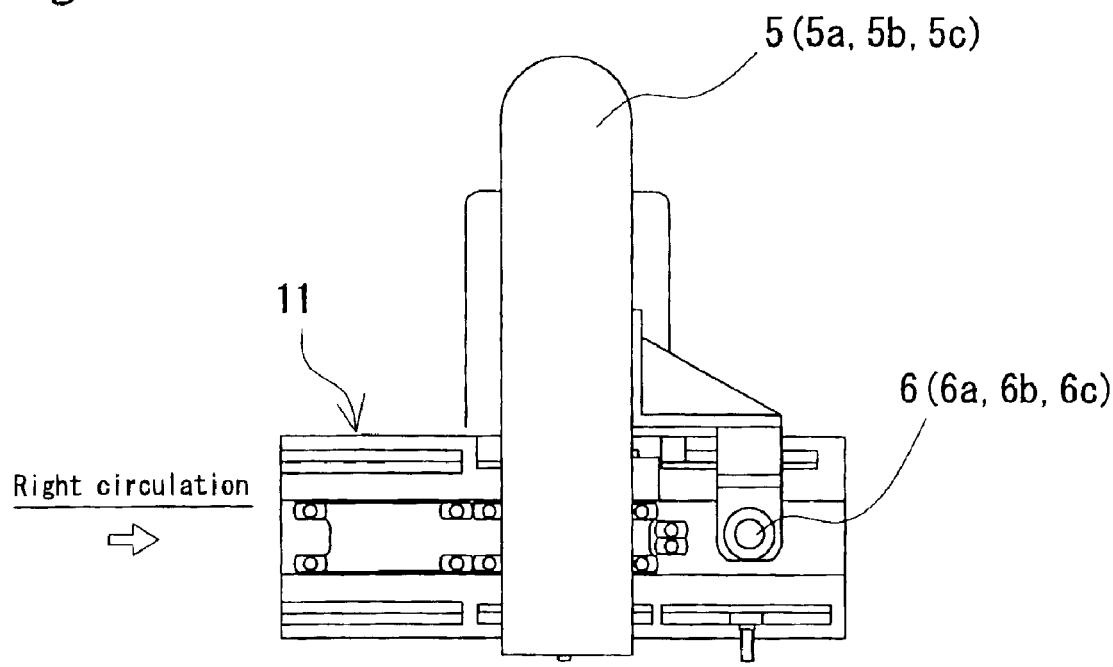
FIG. 24(a) shows right circulation.
Figure 24B:
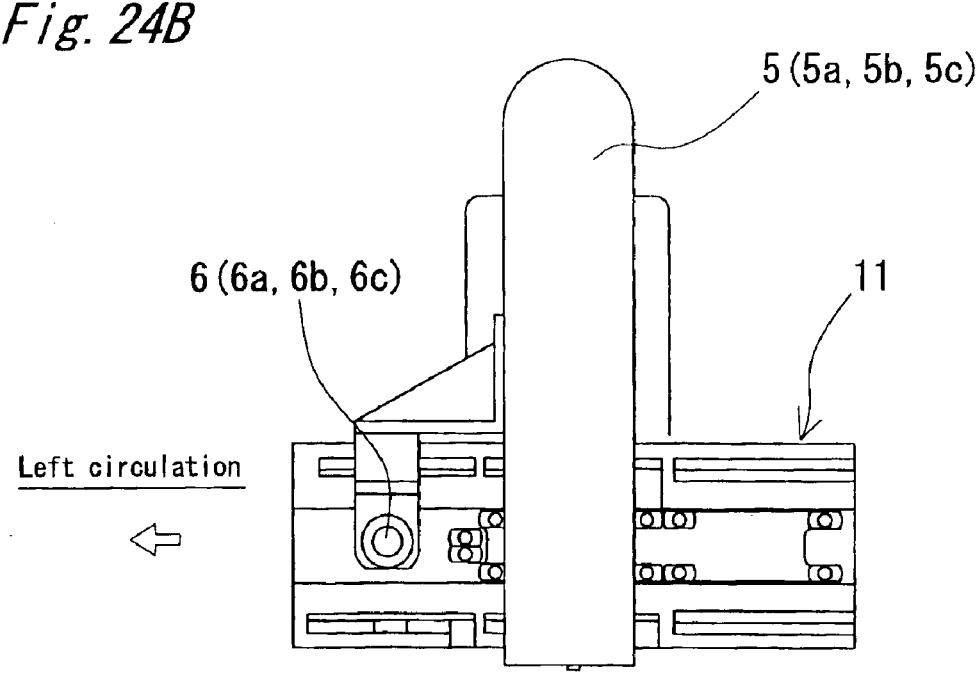
FIG. 24(b) shows left circulation.

Further, the machine tools (accuracy boring machine 5a, honing machines 5b, 5c) of the processing cell A ($A_1$, $A_2$, $A_3$) and the detecting device 6 (6a, 6b, 6c) are designed as shown in FIGS. 24(a), (b), so that the detecting device 6 may be detached from the honing machine 5, and only by exchanging the measuring position 6 right or left to the honing machine 5, the flow direction of works W is inverted normally and reversely (FIG. 24(a) shows right circulation, and FIG. 24(b) left circulation).

The delivery cell B has a unit structure including a conveying device 211 forming a part of the work conveying route 1, and in the illustrated embodiment, aside from this conveying device 211, it also comprises the work feeder 2 and work loading and unloading robot 3.

The conveying device 211 includes a conveying rail 215 for conveying the works W to be processed, and a delivery device 217.

The conveying rail 215 is nearly identical in structure with the conveying rail 21 of the processing cells $A_1$, $A_2$, $A_3$, and its specific explanation is omitted. This conveying rail 215 forms from the delivery position $P_1$ in the work conveying route 1 to the loading $P_2$ of the honing processing section.

The conveying device 217 conveys the honing jig 20 from the delivery position $P_1$ to the loading $P_2$ of the honing processing section, that is, the detection position of the prepared hole detecting device 4, and specifically it is composed of an air cylinder device.

The work feeder 2 feeds the work W to the receiving position of the work loading and unloading robot 3, and specifically the works to be processed W, W, . . . are conveyed sequentially and continuously up to the receiving position while the position is adjusted on the conveying pallet, and wait for the work loading and unloading robot 3.

The work loading and unloading robot 3 has a conventional structure although not shown specifically, and is composed of a device main body in a form of oscillating arm, and a work chuck in a form of collect chuck. The work chuck is elevated or lowered, and contracted or expanded at the receiving position the work feeder 2 and at the delivery position $P_1$ to catch or release the work W, and conveys the work between the two positions in the horizontal direction while chucking, and further rotates the work W about the vertical axis within the honing jig 20 at the work delivery position $P_1$.

The discharge cell C has a unit structure including a conveying device 221 forming a part of the work conveying route 1, and in the illustrated embodiment, aside from the conveying device 221, it also comprises a brush device 222 and an air blow device 223.

The conveying device 221 includes a return rail 224 for returning the processed works W, and a discharge device 225.

The return rail 224 is nearly identical in structure with the conveying rail 21 of the processing cells $A_1$, $A_2$, $A_3$, and its specific explanation is omitted. This return rail 224 forms from the discharge position $P_3$ in the work conveying route 1 to the return position $P_4$.

The discharge device 225 conveys the honing jig 20 from the discharge position $P_3$ to the return position $P_4$, and is specifically composed of an air cylinder device.

The brush device 222 and air blow device 223 are to clean the processed surface of the processed works W by brush or air blow, and are respectively installed at the discharge position $P_3$ and return position $P_4$.

Thus, the work conveying route 1 composed of the conveying rails 215, 21, 21, and 21 of the delivery cell B, processing cells $A_1$, $A_2$, $A_3$, and discharge cell C, and return rails 224, 45, 45, and 45 forms a rectangular loop, as shown in FIG. 1, starting from the work delivery position $P_1$, sequentially passing through the prepared hole detecting device 4, accuracy boring machine 5a, detecting device 6a for boring, detecting device 6b for intermediate processing in intermediate honing machine 5b, finish honing machine 5c, and finish detecting device 6c, and reaching up to the discharge position $P_3$ and return position $P_4$, and returning to the work delivery position $P_1$.

Figure 25:
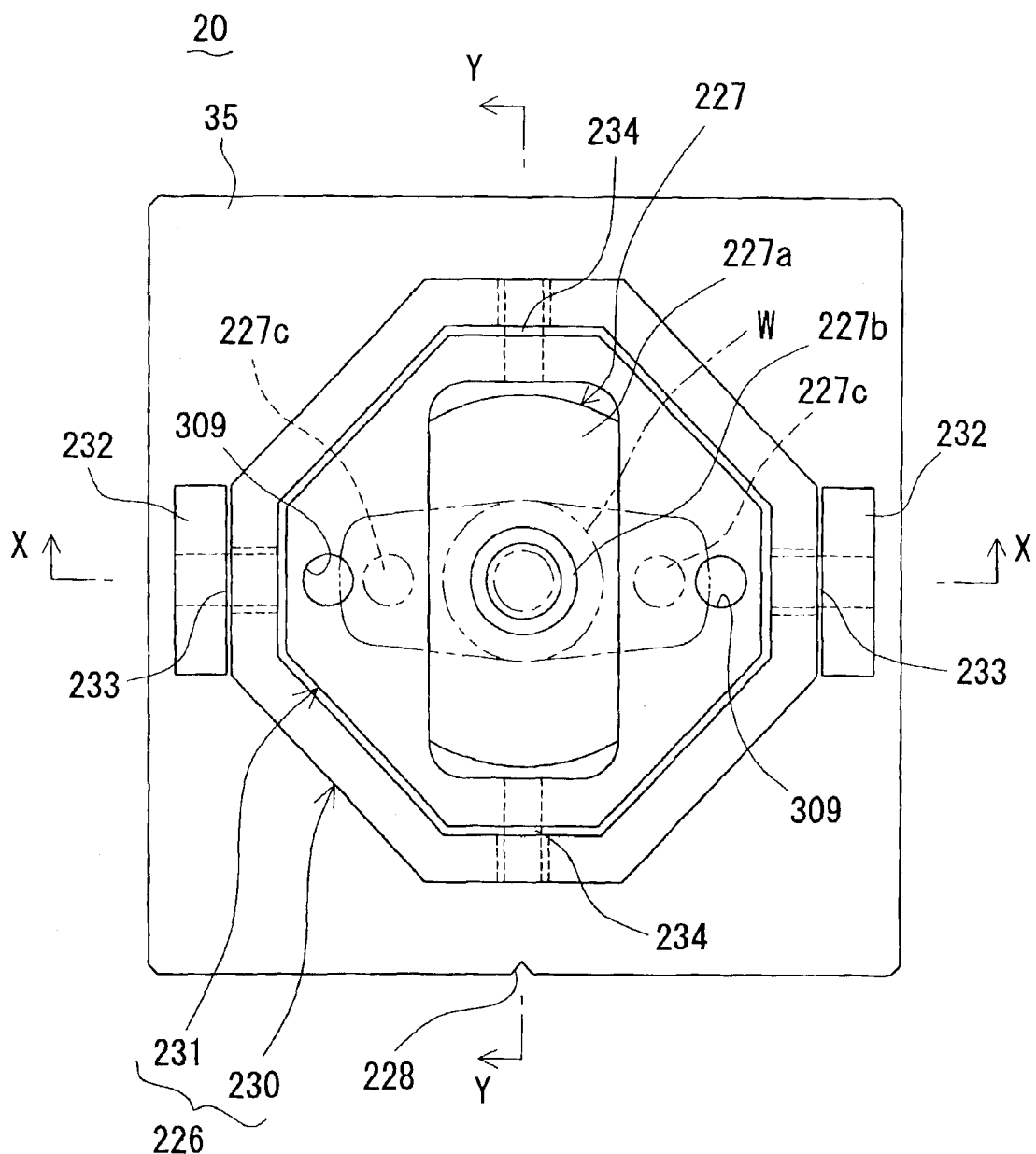
FIG. 25 is a plan showing a honing jig used in the automatic honing system.
Figure 26:
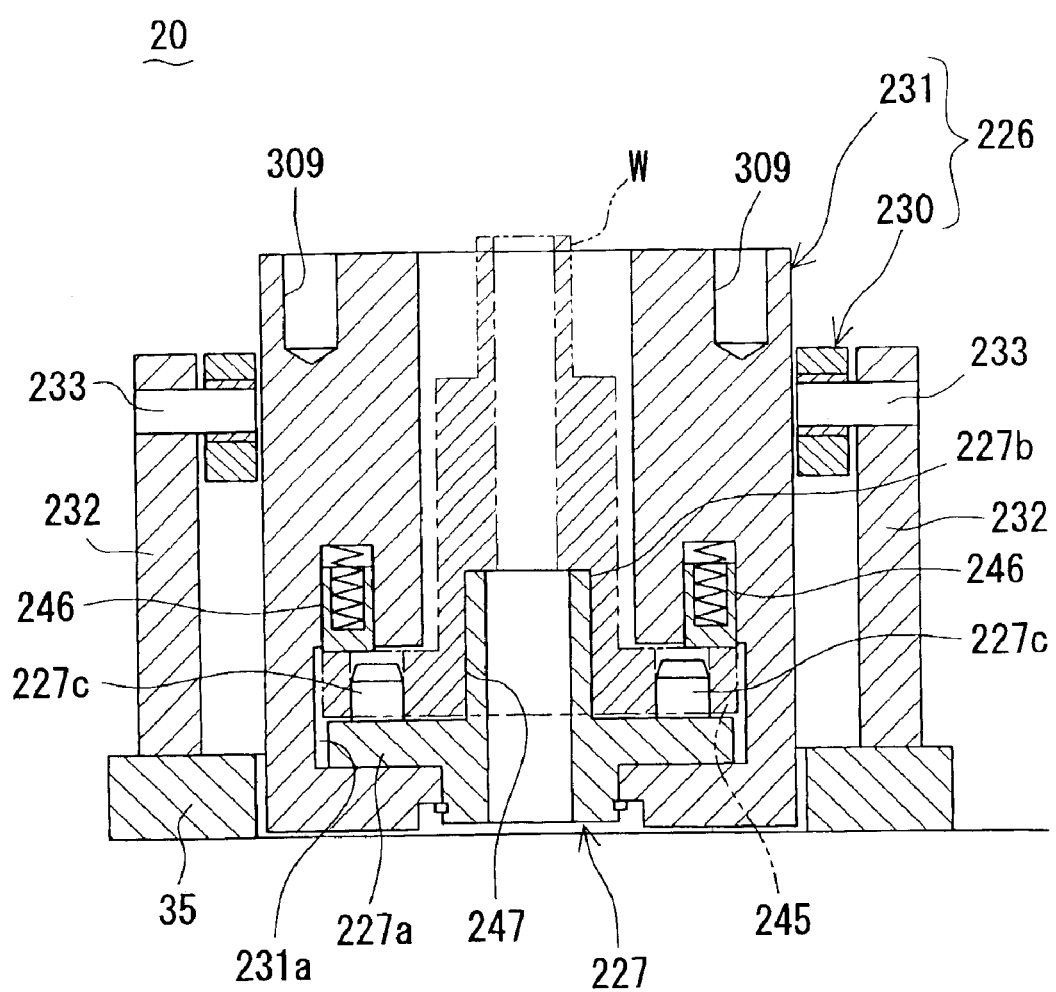
FIG. 26 is a longitudinal sectional view of the honing jig shown along line X—X in FIG. 25.
Figure 27:
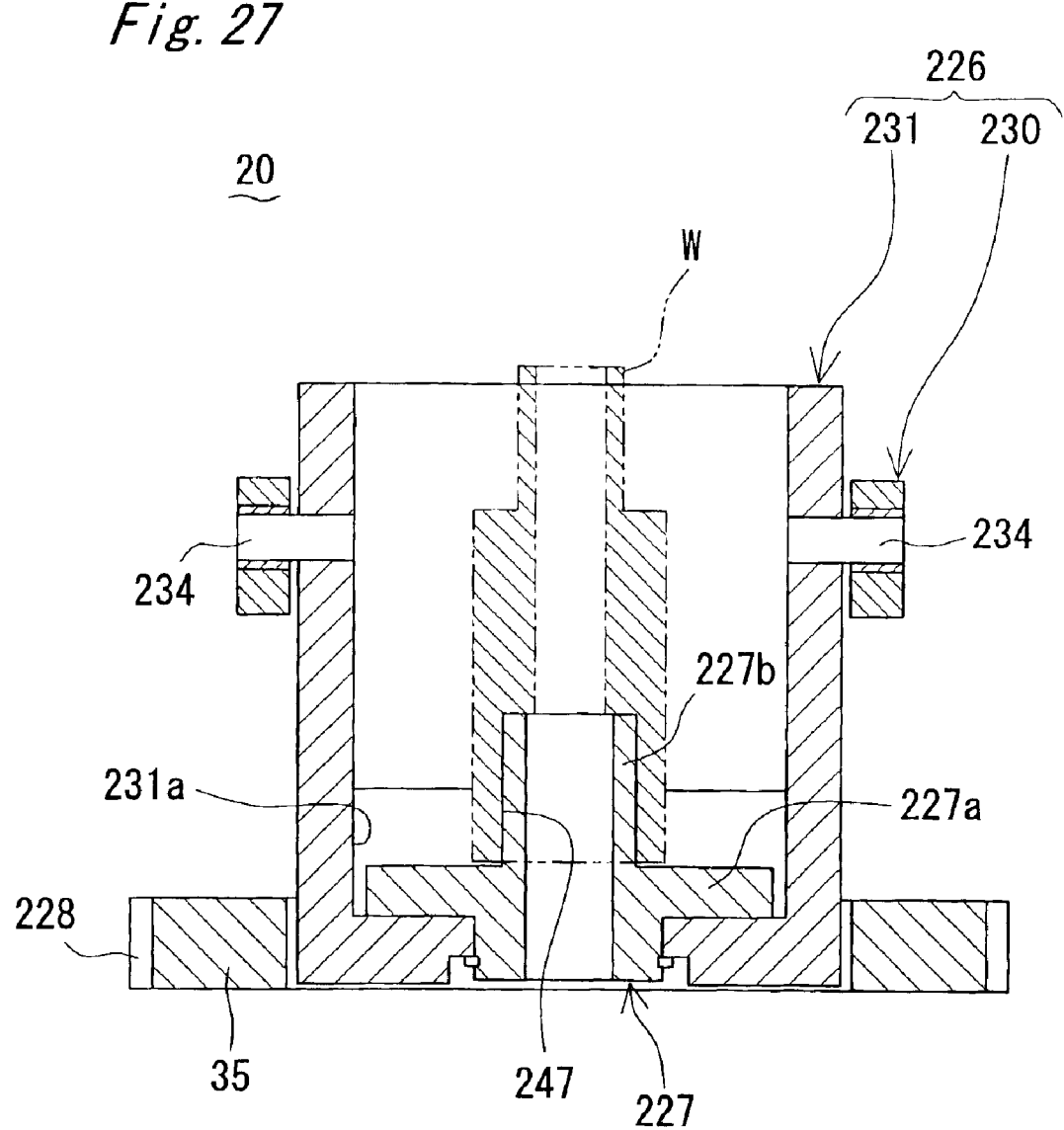
FIG. 27 is a longitudinal sectional view of the honing jig shown along line Y—Y in FIG. 25.
Figure 28A:
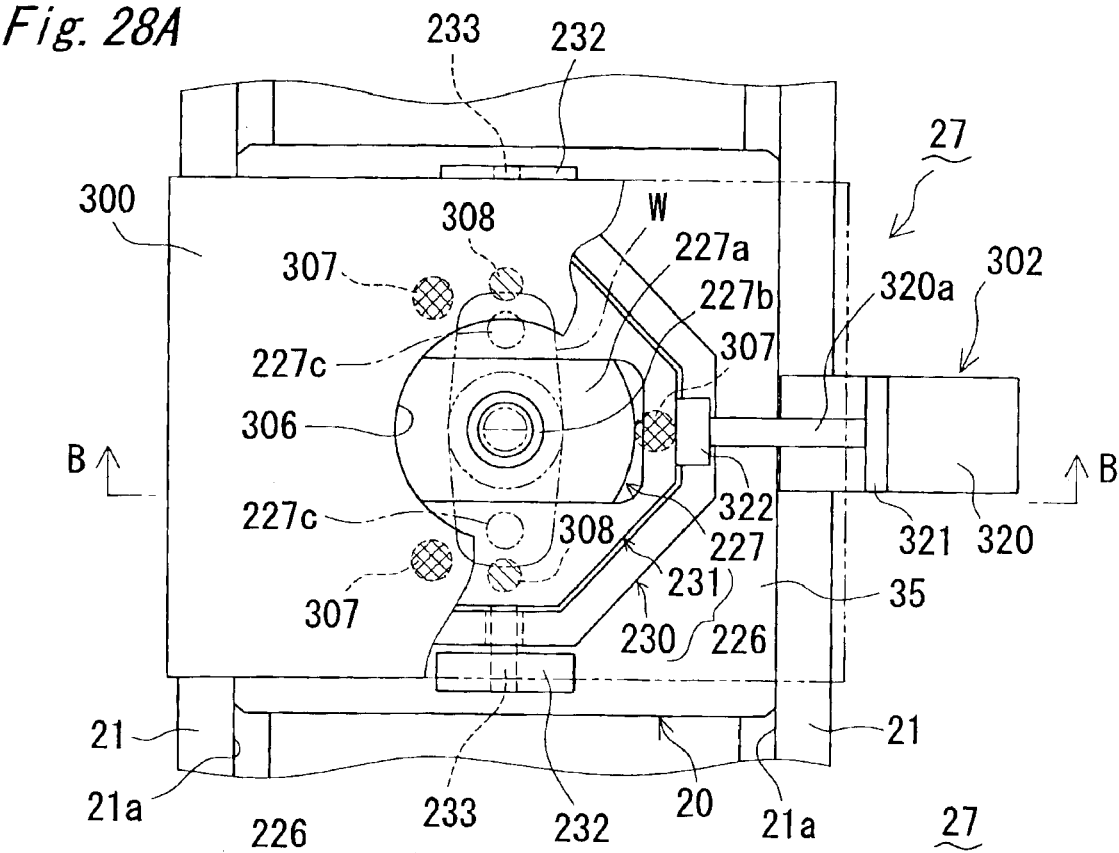
FIG. 28(a) is a partially cut-away plan view.
Figure 28B:
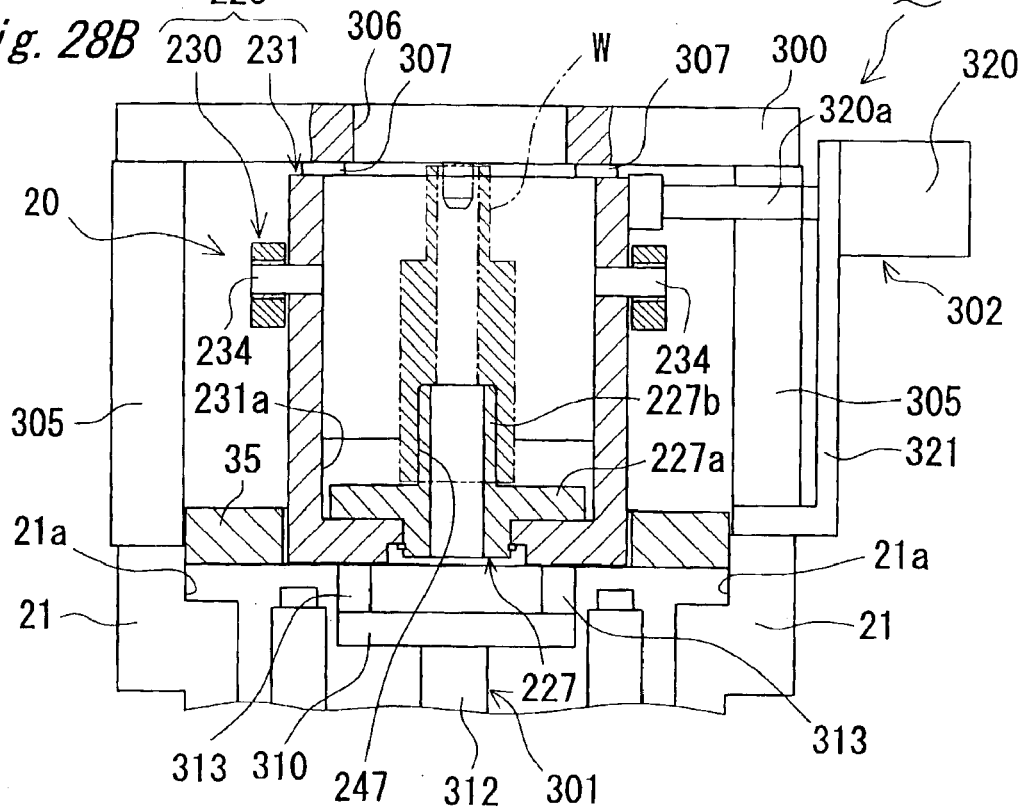
FIG. 28(b) is a sectional view along line B—B in FIG. 28(a).

The honing jig 20 holding the work W, being conveyed in the work conveying route 1, is mainly composed of a jig base (or pallet) 35, an oscillating body 226, and a work holder 227, as shown in FIG. 25 to FIG. 27.

Figure 29A:
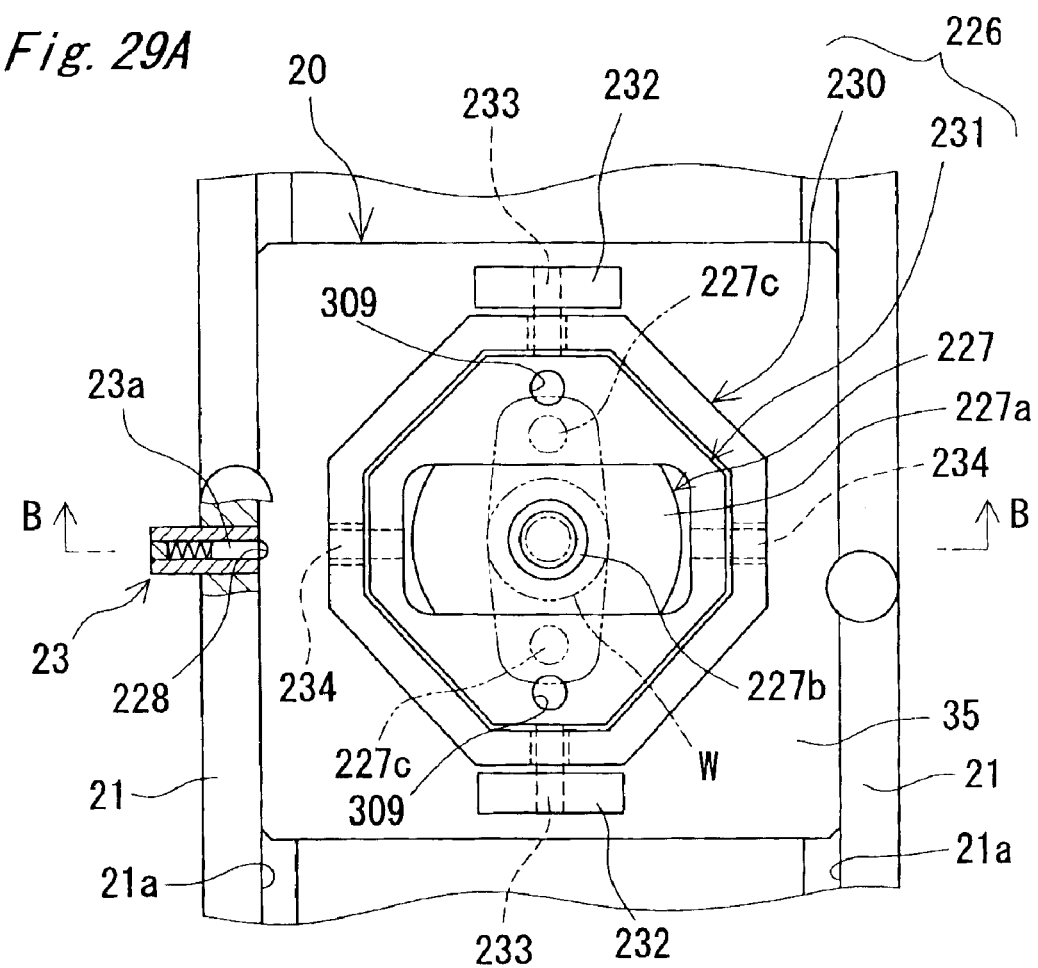
FIG. 29(a) is a partially cut-away plan view.
Figure 29B:
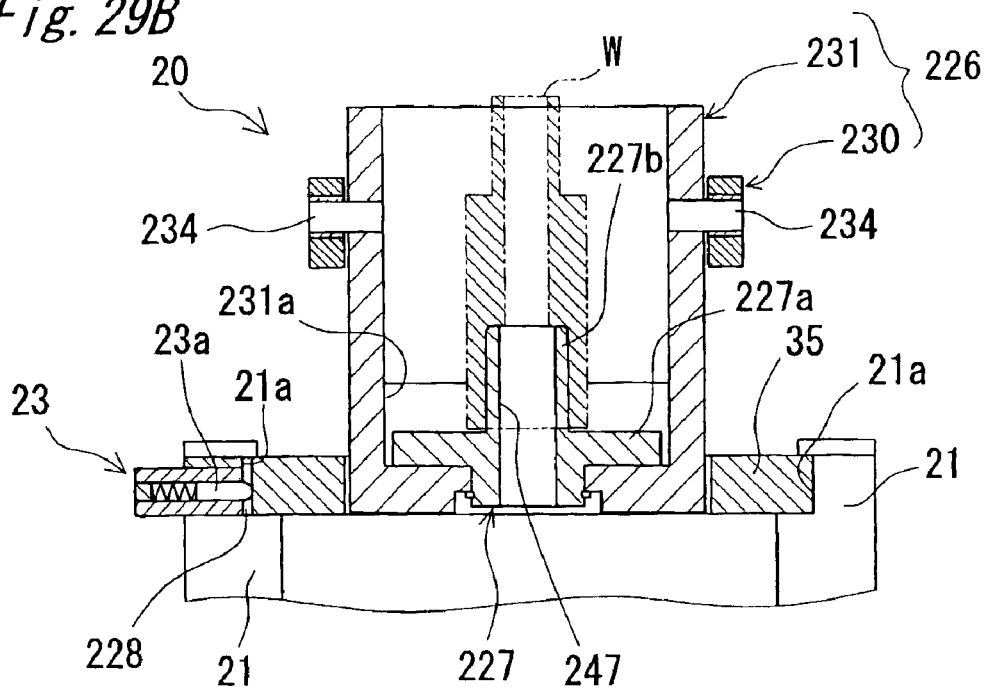
FIG. 29(b) is a sectional view along line B—B in FIG. 29(a).
Figure 30:
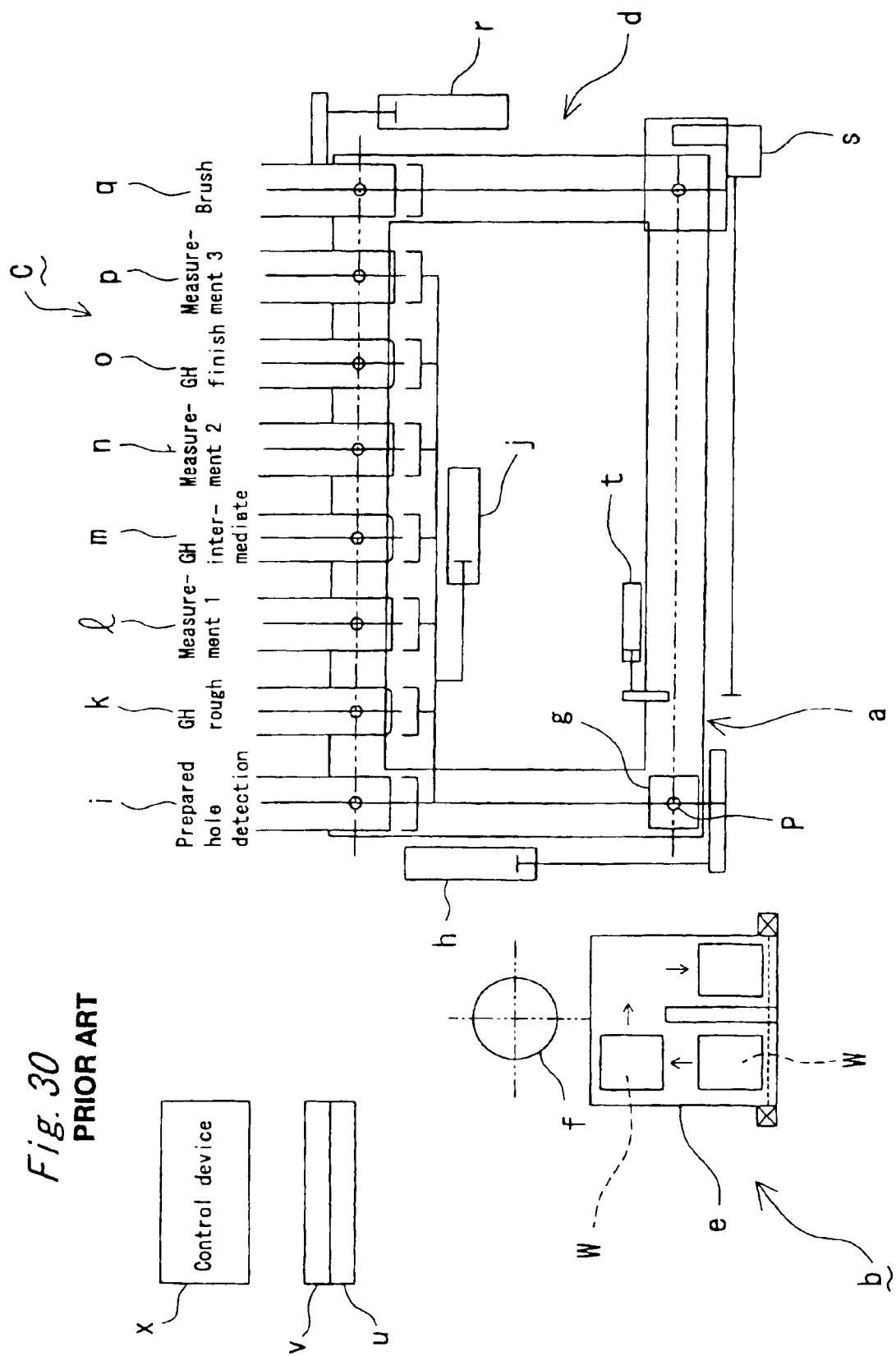
FIG. 30 is a plan view showing a schematic configuration of a conventional automatic honing system.

The jig base 35 is a nearly square plane as shown in FIG. 25, and is movably installed on the work conveying route 1 as mentioned above. A stop recess 228 is provided in the middle of one side of the jig base 35, and this stop recess 228 is repulsively engaged with to fix the positioning device 23 of the work conveying route 1 in the processing cells $A_2$, $A_3$, as shown in FIG. 29.

That is, the positioning device 23 of the processing cells $A_2$, $A_3$ is, for example, a positioning plunger 23a using a straight core pin or arresting balls as the stopping means, and is disposed at the processing position $Q_2$ of the honing machine 5 (5b, 5c) and the measuring position $Q_1$ of the detecting device 6 (6b, 6c). The stopping portion 23a of these positioning devices 23 is repulsively engaged with the stop recess 228 of the jig base 35, so that the honing jig 20 is positioned.

On the other hand, the positioning device 23 of the processing cell $A_1$ has its front side in a form of positioning cylinder 23b, while its rear side is in a form of a positioning plunger 23c using straight core pin or arresting ball as stopping means, and these front and rear positioning devices 23b, 23c are engaged with the front and rear ends of the jig base 35, thereby positioning the honing jig 20.

The oscillating body 226 is disposed on the jig base 35 oscillatably in three dimensions, and consists of a first oscillating member 230 and a second oscillating member 231.

The first oscillating member 230 is oscillatably suspended on the support posts 232, 232 of the jig base 35 through X-cross pins 233, 233, and the second oscillating member 231 is oscillatably suspended at the outside of the first oscillating member 230 through Y-cross pins 234, 234 orthogonal to the X-cross pins 233.

As a result, the second oscillating member 231 is oscillatable in three dimensions as the motion of the Y-cross pins 234, 234 (rotation about Y—Y axis) is added to the motion of the X-cross pins 233, 233 (rotation about X—X axis) Accordingly, as mentioned below, a favorable and uniform following performance to the honing tool 160 is assured, and the processing accuracy error is avoided, and honing of high accuracy is assured.

A work holder 227 is designed to position and hold the work W, and is mounted on the second oscillating member 231 of the oscillating body 226 detachably and rotatably in the horizontal direction, so that it is flexible to cope with changes in shape and size of the works W to be processed.

This work holder 227 is composed as shown in FIG. 26 and FIG. 27, in which a cylindrical work holding part 227b for supporting the work W from the lower side is provided integrally in a raised form in the middle of a disk-shaped holder main body 227a, and stopping pins 227c, 227c for stopping and fixing the work W are provided integrally in a raised form on a diametral position of the holder main body 227a.

Corresponding to the work holding structural of the work holder 227, at the bottom of the second oscillating member 231, there is an accommodating space 231a for accommodating the holder main body 227a of the work holder 227 and the flange 245 of the work W rotatably in the horizontal direction, while plungers 246, 246 for thrusting the flange 245 of the work W in steps are provided in the ceiling.

Although not shown specifically, for mounting the work W on the work holder 227, the work W is chucked by the work loading and unloading robot 3, the stopping pins 227c, 227c of the work holder 227 are inserted into the holes in the flange 245 of the work W, the prepared hole 247 is held and supported to the work holding part 227b from the upper side, and in this state the work W is rotated about the axis of the work holding part 227b together with the work holder 227, and the plungers 246, 246 are repulsively stopped, and this state is held. On the other hand, the work W is dismounted from the work holder 227 automatically in the reverse procedure by the work loading and unloading robot 3.

By such three-dimensional oscillation of the oscillating body 226, as mentioned above, the honing jig 20 follows up the work W uniformly and favorably, and assures honing process of high accuracy by the honing tool 160 of the honing machines 5b, 5c, while the work W must be fixed on the boring bar 60 of the accuracy boring machine 5a.

For this purpose, as mentioned above, at the processing position $Q_2$ of the accuracy boring machine 5a, a lock device 27 is provided for fixing the work W on the honing jig 20 positioned by the positioning device 23.

This lock device 27 is for fixing and supporting the oscillating body 226 of the honing jig 20, and in the illustrated embodiment, it is designed to fix and support the second oscillating member 231.

That is, the lock device 27 mainly comprises a jig positioning base 300, a jig lifting device 301, and a jig fixing device 302.

The jig positioning base 300 is for positioning and supporting the second oscillating member 226 of the honing jig 20, and is disposed horizontally on the conveying rail 21 of the conveying section 11 by means of four posts 305, 305, . . .

In the middle of the jig positioning base 300, there is an insert hole 306 for inserting the boring bar 60 of the accuracy boring machine 5a. At the lower side of the jig positioning base 300, plural (three in this example) positioning reference seats 307, 307, 307 are provided for keeping the horizontal state of the second oscillating member 226, and the upper end of the second oscillating member 226 is held and supported on them. Further, at the lower side of the jig positioning base 300, plural (two in this example) positioning pins 308, 308 are provided oppositely to each other for positioning in the horizontal direction, and corresponding to this configuration, at the upper side of the second oscillating member 226, positioning holes 309, 309 are provided, and by inserting the positioning pins 308, 308 into them, the second oscillating member 226 is positioned in the horizontal direction.

The jig lifting device 301 is for lifting the honing jig 20 upward in the vertical direction, and is provided between the conveying rails 21, 21 of the conveying section 11. This jig lifting device 301 is mainly composed of push-up table 310 and a push-up cylinder 311.

The push-up table 310 is installed and supported in horizontal state at the upper end of an elevating rod 312 movably supported in the vertical direction on the conveying section platform 24 between the conveying rails 21, 21. The push-up table 310 is formed like a disk, and three push-up members 313, 313, 313 are provided on the upper surface, and stopping pins 313a, 313a, 313a at their leading ends are inserted into the engaging holes (not shown) provided in the bottom of the second oscillating member 231.

The lower end of the elevating rod 312 is coaxially coupled with the piston rod 311a of the push-up cylinder 311 through a coupling 314, and the push-up cylinder 311 is fitted and fixed on the conveying section platform 24.

The push-up members 313, 313, 313 of the push-up table 310, and the positioning pins 308, 308 of the jig positioning base 300 are configured so that the horizontal positions may correspond to each other, and therefore the second oscillating member 226 engaged and supported by the push-up members 313, 313, 313 of the push-up table 310 is positioned so that the positioning holes 309, 309 may directly correspond to the positioning pins 308, 308.

The jig fixing device 302 is for pressing and fixing the second oscillating member 231 which is lifted by the jig lifting device 301 and fixed and supported on the jig positioning base 300, sideways in the horizontal direction, and it is mainly composed of an air cylinder 320. The air cylinder 320 is mounted and supported on one conveying rail 21 by means of a mounting bracket 321, and a pressure pad 322 is fitted to the leading end of its piston rod 320a.

The honing jig 20 thus sent to the processing position $Q_2$ of the processing cell $A_1$ is first positioned by the positioning device 23 (positioning cylinder 23b, positioning plunger 23c), and the second oscillating member 231 is lifted upward in the vertical direction by the push-up table 310 of the jig lifting device 301, and is fixed and supported on the jig positioning base 300. In this state, the work W held by the second oscillating member 231, that is, by the work holder 227 is positioned and fixed in the horizontal direction while its horizontal state is maintained, and other parts of the honing jig 20, that is, the first oscillating member 230 and jig base 35 suspended and supported on the second oscillating member 231.

Further, the piston rod 320a of the air cylinder 320 of the jig fixing device 302 projects, and the second oscillating member 231 is pressed and fixed sideways in the horizontal direction by the pressure pad 322, so that the work W is positioned and fixed precisely on the boring bar 60 of the accuracy boring machine 5a.

The honing process by using the automatic honing system having such configuration is explained below.

I. Delivery of Works W

Works W, W, . . . are conveyed sequentially and continuously to the receiving position while the position is being adjusted, by means of the work feeder 2, and chucked one by one by the work loading and unloading robot 3, and mounted on the work holder 227 of the honing jig 20 waiting at the work delivery position $P_1$ of the work conveying route 1. As a result, the work W is held oscillatably in three dimensions by the floating structure of the honing jig 20.

II. Automatic Honing of Works W i) When the mounting step of the works W on the honing jig 20 at the work delivery position $P_1$ is completed, the deliver device 217 is put in action, and this honing jig 20 (or the work W hereinafter) is conveyed to the loading $P_2$ of the honing processing section, that is, the detecting position of the prepared hole detecting device 4, and after being positioned by the positioning device 23, the prepared hole detecting device 4 detects the inside diameter of the prepared hole of the processing hole 92 of the work W according to the specified procedure, and the result of detection is sent to the control units 7 (7a, 7b, 7c) of the accuracy boring machine 5a and honing machines 5b, 5c.

ii) In this case, as prior step of honing, the processing hole 92 is processed by the accuracy boring machine 5a so that the inside diameter of the prepared hole may settle within a specified honing range, and at the same time by heat treatment or straightening, the stock removal may be increased or the end face squareness or concentricity may be corrected, and then honing is executed by the honing machines 5b, 5c.

That is, the work W positioned at the loading $P_1$ is sequentially conveyed in cycle operation by means of the conveying section 11 of the processing cells A ($A_1$, $A_2$, $A_3$) in the sequence of the accuracy boring machine 5a, first detecting device 6a for boring, second honing machine 5b for intermediate processing, second detecting device 6b for intermediate processing, third honing machine 5c for finishing, and third detecting device 6c for finishing, and is positioned by the positioning device 23 at each position of the device (at the processing position $Q_1$ of the accuracy boring machine 5a, further by the lock device 27, oscillation of the work holder 227 is locked and stopped), and the specified process is executed sequentially (accuracy boring machine 5a of processing cell $A_1$, honing by honing machines 5b, 5c of processing cells $A_2$, $A_3$, and measurement of work processing diameter by the detecting devices 6a, 6b, 6c), and the result of measurement of the processing hole 92 of the work W by the detecting device 6c for finishing (final finish dimension) is fed back to the second honing machine 5c, and the approval or rejection signal of the work W is sent to the work sorting device 331.

III. Discharge of Works W

The work W discharged to the discharge position $P_3$ after a series of honing steps is sent to the return position $P_4$ by the discharge device 225, and send back to the work delivery position $P_1$ by the return section 12 of the processing cells A ($A_1$, $A_2$, $A_3$), and is chucked by the work loading and unloading robot 3, and is dismounted from the work holder 227 of the honing jig 20 in the specified procedure, and is sorted according to the result of sorting by the work sorting device 331, and is discharged into the discharge chute 332.

On the other hand, the honing jig 20 from which the work W is removed waits at the work delivery position $P_1$ until the next work W is mounted by the work loading and unloading robot 3.

In the automatic honing system thus composed, prior to honing by the honing machines 5b, 5c, the work W is drilled by the boring machine 5a, and therefore the hole is processed more precisely than in the conventional automatic honing system.

That is, since the honing process is a so-called copying process of processing according to the shape of the prepared hole of the work W (for example, if the prepared hole is bent, a bent hole is processed), in the conventional honing system, the final finish accuracy depends greatly on the processing accuracy of the prepared hole.

By contrast, in this automatic honing system, prior to honing, the prepared hole is processed by force by the accuracy boring machine 5a. Accordingly, the prepared hole of the work W is enhanced in accuracy by 1) correction to increase the stock removal by heat treatment or straightening, 2) forced correction regardless of processing accuracy (roundness, cylindricality, etc.), and 3) correction of end face squareness or concentricity that could not be corrected in the conventional honing process. As a result, the final finish accuracy in this automatic honing system is free from effects of the processing accuracy of the prepared hole of the work W, so that hole processing of higher accuracy can be done in a smaller number of process.

Besides, in the automatic honing system, the processing cells A ($A_1$, $A_2$, $A_3$) are connected and arranged so as to be freely increased or decreased in number to compose the honing section, and therefore the structure is small, lightweight and simple, and the number of process can be determined or changed easily, the design is free, and the apparatus cost can be saved.

That is, the number of process of honing process is determined depending on the shape and accuracy of prepared hole of the work, stock removal, and required shape and accuracy, and hence the accuracy of the prepared hole shape and stock removal are not stable in the trial production stage, but since the number of processing cells A ($A_1$, $A_2$, $A_3$) for composing the honing section of the automatic honing section can be freely increased or decreased, if the number of process cannot be determined in an early stage, it can be freely changed later.

By the same reason, if the accuracy of the prepared hole of the work is changed, or if the required processing accuracy of the work is changed, by properly combining the processing cells A ($A_1$, $A_2$, $A_3$) which can be freely increased or decreased in number, the number of process can be changed promptly and easily.

Also by the same reason, if it is difficult to predict the production amount of works W, the capital investment can be determined easily by considering changeover of multiple models or dispersion of processes including the processing cells A freely increased or decreased in number.

Moreover, since the processing cells A ($A_1$, $A_2$, $A_3$) are composed in unit structure comprising the conveying device 10 composing a part of the work conveying route 1, a single honing machine (accuracy boring machine 5a, honing machines 5b, 5c), and a control unit 7 (7a, 7b, 7c) for linking them mutually and controlling, so as to be freely increased or decreased in number, if production of the specific works W designed to be processed is stopped, in order to use for machining of other works W differing in shape, dimension and machining conditions, part of the system may be modified or changed, the processing cells A can be properly increased or decreased, depending on the shape, dimensions and processing conditions of the works W.

Further, since the processing cells A ($A_1$, $A_2$, $A_3$) are in unit structure, the constituent parts, such as spindle cooler 103, chip collector 104, hydraulic units 102, 202, spindle cooler 103, and coolant tank 204 are independent in each one of the processing cells A ($A_1$, $A_2$, $A_3$), and are small in size, and can be mounted on the apparatus frame 101 of each processing cell A ($A_1$, $A_2$, $A_3$), so that the entire system is simplified and reduced in size.

The foregoing examples are only preferred embodiments of the invention, and the invention is not limited to them alone, but may be changed and modified in various designs.

For example, in the illustrated embodiments, the work conveying route 1 is formed in a loop, and the honing jig 20 is circulated from the work delivery position $P_1$ and back to this work delivery position $P_1$ again, but it may be also formed in a straight line, and continued to a next process. In such a case, although not shown, for example, the work W is mounted on the honing jig 20 at the work delivery position, and is dismounted from the honing jig 20 at the work discharge position, and only the honing jig 20 is returned to the work delivery position.

The internal structure of the processing cells A ($A_1$, $A_2$, $A_3$), B, and C for composing the honing system and the specific structure of each unit are not limited to the illustrated embodiments, but may be freely changed or modified.

For example, in the processing cells A ($A_1$, $A_2$, $A_3$) of the illustrated embodiments, the detecting device 6 is installed in a station independent from the honing machine 5, but it may be installed integrally with the honing machine 5 so as to measure in process.

In the illustrated embodiments, the machine tool is the automatic honing system for hole processing consisting of processing cell $A_1$ having accuracy boring machine 5a, and processing cells $A_2$, $A_3$ having honing machines 5b, 5c, but the invention may be applied in various automatic machine tool systems including the machine tools of single type or machine tools of plural types.

INDUSTRIAL APPLICABILITY

As described herein, according to the processing cells of the invention, having a unit structure at least comprising a conveying device for composing a part of a work conveying route, a single machine tool, and a control unit for linking them mutually and controlling, since these cells are incorporated in the automatic machining system to compose the machining section freely so as to be increased or decreased in number, for example, in the case of an automatic honing system having honing machines as machine tools, the following effects are obtained, and the structure is small, lightweight and simple, and the number of process can be determined or changed easily, the design is free, and the apparatus cost can be saved, and processing cells of automatic machining system having such features are presented.

(1) The number of process in the honing process is determined by the accuracy of shape of the prepared hole of the work, stock removal, and required shape accuracy, and in the stage of trial production, the accuracy of prepared hole shape and stock removal are not stable, while the processing cells of the invention are designed to be incorporated in the honing section of the automatic honing system by increasing or decreasing in number freely, and therefore if the number of process cannot be determined early, it can be determined effectively later.

(2) By the same reason, if the accuracy of the prepared hole of the work is changed, or if the required processing accuracy of the work is changed, by properly combining the processing cells which can be freely increased or decreased in number, the number of process can be changed promptly and easily.

(3) Also by the same reason, if it is difficult to predict the production amount of works, the capital investment can be determined easily by considering changeover of multiple models or dispersion of processes including the processing cells freely increased or decreased in number.

(4) Moreover, since the processing cells are composed in unit structure comprising the conveying device composing a part of the work conveying route, a single honing machine, and a control unit for linking them mutually and controlling, so as to be freely increased or decreased in number, if production of the specific works designed to be processed is stopped, in order to use for machining of other works differing in shape, dimension and machining conditions, part of the system may be modified or changed, the processing cells can be properly increased or decreased, depending on the shape, dimensions and processing conditions of the works, so that the apparatus cost can be lowered.

(5) Further, since the processing cells are in cell structure, hydraulic units as drive source of the constituent devices, and coolant tanks used in machining, and others can be set independently and reduced in size in each processing cell, and can be mounted on the main body frame of each processing cell, so that the entire system is simplified and reduced in size, and hence the apparatus cost can be lowered.

(6) Further, in the automatic honing system having accuracy boring machine as prior process by the honing machine as the machine tool, since the work is processed by the boring machine prior to honing process by the honing machine, the prepared hole of the work can be enhanced in accuracy by correction to increase the stock removal by heat treatment or straightening, forced correction regardless of processing accuracy (roundness, cylindricality, etc.), and correction of end face squareness or concentricity that could not be corrected in the conventional honing process.

As a result, the final finish accuracy in this automatic honing system is free from effects of the processing accuracy of the prepared hole of the work, so that hole processing of higher accuracy can be done in a smaller number of process.

what is claimed is:

1. A processing cell of an automatic honing system having a honing section and a conveying section for intermittently conveying works along a work conveying route at specific intervals, said processing cell having a unit structure comprising:

a conveying device disposed along and for conveying the work along the work conveying route, a single honing machine tool, a detecting device for measuring a processed diameter of a processing hole of the work, and a control unit for linking and controlling the conveying device, the single honing machine and the detecting device; and being installed in the honing section of the automatic honing system so as to be freely increased or decreased in number; and the control unit is constructed such that by setting the program composition of the control unit, the control unit controls the honing machine so that the processing cell selectively functions as a particular honing cell for performing a predetermined grade honing process.

2. The processing cell of the automatic honing system of claim 1, wherein said conveying device comprises a conveying rail for mounting and guiding a processing jig for accommodating and holding the works, work moving means for sending the processing jig mounted on the conveying rail to a specified position, and positioning means for positioning the processing jig sent by the work moving means at the specified position.

3. The processing cell of the automatic honing system of claim 2,
wherein said work moving means is composed of a cylinder device for pressing and moving said processing jig.

4. The processing cell of the automatic honing system of claim 2,
wherein said conveying device further comprises a return rail for mounting and guiding the processing jig for accommodating and holding the works finished after processing, and work returning means for returning and moving the processing jig mounted on the return rail.

5. The processing cell of the automatic honing system of claim 4,
wherein said work returning means is an endless conveying device for conveying the processing jig in an endless operation.

6. The processing cell of the automatic honing system of claim 4,
wherein the conveying rail and return rail of the conveying device are positioned and arranged to form a part of a straight portion of the work conveying route, so that the honing section of the automatic honing system is combined.

7. The processing cell of the automatic honing system of claim 2,
wherein the conveying rail of the conveying device is positioned and arranged to form a part of a straight portion of the work conveying route, so that the honing section of the automatic honing system is combined.

8. The processing cell of the automatic honing system of claim 1,
wherein said honing machine tool comprises a rotary spindle movable reciprocally in an axial direction of an inner circumference of a processing hole of the work and supported rotatably about an axial line, spindle rotating means for driving and rotating the rotary spindle about the axial line, spindle reciprocating means for reciprocating the rotary spindle in the axial direction of the inner circumference of the processing hole, a honing tool mounted at a leading end of the rotary spindle and having an expandable honing wheel with a wheel surface along the inner circumference of the processing hole, wheel driving means for applying a specified infeed operation of the honing wheel of the honing tool, and control means for automatically controlling the operations of the spindle rotating means, spindle reciprocating means, and wheel driving means.

9. The processing cell of the automatic honing system of claim 1,
wherein said conveying device has a structure capable of inverting the flow of works normally and reversely.

10. An automatic honing system for honing works conveyed along a work conveying route intermittently at specific intervals, by using plural honing machines disposed along the work conveying route for conveying the works, comprising:
a honing section for honing the works composed of a plurality of honing cells for honing the works, the honing cells being installed so as to be freely increased or decreased in number, and the plurality of honing cells being linked together, driven and controlled; and
said honing cells each having a unit structure comprising a conveying device disposed along and for conveying the work along the work conveying route, a single one of the honing machines, a detecting device for measuring a processing diameter of a processing hole of the work, and a control unit for linking and controlling the conveying device, and the single honing machine and the detecting device; and
wherein each control unit is constructed such that by setting the program composition of the control unit, the control unit controls the respective honing machine so that the respective processing cell selectively functions as a particular honing cell for performing a predetermined grade honing process.

11. The automatic honing system of claim 10,
wherein said honing machine of each honing cell comprises a rotary spindle movable reciprocally in an axial direction of an inner circumference of a processing hole of the work and supported rotatably about an axial line, spindle rotating means for driving and rotating the rotary spindle about the axial line, spindle reciprocating means for reciprocating the rotary spindle in the axial direction of the inner circumference of the processing hole, a honing tool mounted at the leading end of the rotary spindle and having an expandable honing wheel with the wheel surface along the inner circumference of the processing hole, wheel driving means for applying a specified infeed operation of the honing wheel of the honing tool, and control means for automatically controlling the operations of the spindle rotating means, spindle reciprocating means, and wheel driving means.

12. The automatic honing system of claim 10,
wherein said honing section comprises boring cells for boring prepared holes of works precisely, and the honing cells for honing the works, being connected together so as to be freely increased or decreased in number, and a plurality of boring and honing cells are linked together, driven and controlled individually or collectively, and
said boring cells each have a unit structure comprising a conveying device disposed along the work conveying route, a single boring machine, and a control unit for linking together and controlling said boring cells.

13. The automatic honing system of claim 10 or 12,
further comprising a loading cell for composing a work delivery section, plural processing cells, and an unloading cell for composing a work discharge section being arrayed and disposed in a straight line, and the work conveying route being formed in a loop.

14. The automatic honing system of claim 13,
wherein said loading cell has a unit structure including a conveying device for composing a part of the work conveying route.

15. The automatic honing system of claim 13,
wherein said unloading cell has a unit structure including a conveying device for composing a part of the work conveying route.

16. The automatic honing system of claim 10 or 12,
further comprising a loading cell for composing a work delivery section, plural processing cells, and an unloading cell for composing a work discharge section being arrayed and disposed in a straight line, and the work conveying route being formed in a straight line.

17. The automatic honing system of claim 16,
wherein said loading cell has a unit structure including a conveying device for composing a part of the work conveying route.

18. The automatic honing system of claim 16,
wherein said unloading cell has a unit structure including a conveying device for composing a part of the work conveying route.

19. The automatic honing system of claim of claim 10 or 12, further comprising:
a honing jig for holding the work, being conveyed in the work conveying route,
wherein the honing jig comprises a jig base movably placed on the work conveying route,
an oscillating body disposed on the jig base oscillatably in three dimensions, and
a work holder attached to the oscillating body.

20. The automatic honing system of claim 10 or 12,
wherein a conveying rail and a return rail of a conveying device are positioned and arranged to form a part of a straight portion of the work conveying route, so that the honing section of the automatic honing system is combined.

21. The automatic honing system of claim 10 or 12, further comprising a conveying device having a structure capable of inverting the flow of works normally and reversely.

22. The automatic honing system of claim 12,
wherein said conveying device of each boring cell comprises locking means for fixing and supporting a work holder of a honing jig positioned at a boring position of a conveying rail.

23. The automatic honing system of claim 12,
wherein said boring machine of each boring cell comprises a rotary spindle movable reciprocally in an axial direction of an inner circumference of the processing hole of the work and supported rotatably about an axial line, spindle rotating means for driving and rotating the rotary spindle about the axial line, spindle feeding means for moving the rotary spindle in the axial direction of the inner circumference of the processing hole, a boring bar having a boring tool mounted at the leading end of the rotary spindle for cutting the inner circumference of the processing hole, and control means for automatically controlling the operations of the spindle rotating means and spindle feeding means.

* * * * *